(12) United States Patent
Hamada

(10) Patent No.: US 7,836,109 B2
(45) Date of Patent: Nov. 16, 2010

(54) DATA STRUCTURE, RECORDING APPARATUS, REPRODUCING APPARATUS, PROGRAM, AND RECORD MEDIUM

(75) Inventor: Toshiya Hamada, Saitama (JP)

(73) Assignee: Sony Corporation, Tokyo (JP)

( * ) Notice: Subject to any disclaimer, the term of this patent is extended or adjusted under 35 U.S.C. 154(b) by 345 days.

(21) Appl. No.: 11/611,537

(22) Filed: Dec. 15, 2006

(65) Prior Publication Data

US 2007/0162817 A1    Jul. 12, 2007

(30) Foreign Application Priority Data

Dec. 28, 2005    (JP) .............................. 2005-377879

(51) Int. Cl.
*G06F 17/30*    (2006.01)
*G06F 15/16*    (2006.01)

(52) U.S. Cl. ...................... 707/828; 707/805; 707/812; 386/92; 386/95; 386/109; 386/124; 386/125

(58) Field of Classification Search ................... 386/95, 386/66, 92, 109, 124, 125; 707/805, 812, 707/830
See application file for complete search history.

(56) References Cited

U.S. PATENT DOCUMENTS

2002/0150383 A1    10/2002    Kato et al.
2004/0184780 A1*    9/2004    Seo et al. ....................... 386/95
2005/0084247 A1*    4/2005    Yoo et al. ...................... 386/95
2005/0163475 A1*    7/2005    Seo et al. ....................... 386/55
2007/0269187 A1*    11/2007   Morimoto et al. ............. 386/95
2008/0205859 A1*    8/2008    Ikeda et al. .................. 386/124

FOREIGN PATENT DOCUMENTS

JP    2002-157859    5/2002

* cited by examiner

*Primary Examiner*—Greta L Robinson
*Assistant Examiner*—Dennis Truong
(74) *Attorney, Agent, or Firm*—Oblon, Spivak, McClelland, Maier & Neustadt, L.L.P.

(57) ABSTRACT

A data structure having at least content data and reproduction control information with which reproduction of the content data is controlled is disclosed. The data structure includes an index table, an object, a play list, and clip information. With the index table, reproduction of content data is managed. The object is called to the index table and represents a method of reproducing at least the content data. The play list is called from the object. The clip information is called based on the play list and represents attribute information of at least the content data. At least the index table, the play list, and the clip information each are capable of containing extension data. The extension data contain main identification information and sub identification information as identification information which identities the extension data.

10 Claims, 23 Drawing Sheets

Fig. 7

| SYNTAX | NO. OF BITS | MNEMONIC |
|---|---|---|
| index.bdmv { | | |
|     type_indicator | 8*4 | bslbf |
|     version_number | 8*4 | bslbf |
|     Indexes_start_address | 32 | uimsbf |
|     ExtensionData_start_address | 32 | uimsbf |
|     reserved_for_future_use | 192 | bslbf |
|     AppInfoBDMV() | | |
|     for (i=0; i<N1; i++) { | | |
|         padding_word | 16 | bslbf |
|     } | | |
|     Indexes() | | |
|     for (i=0; i<N2; i++) { | | |
|         padding_word | 16 | bslbf |
|     } | | |
|     ExtensionData() | | |
|     for (i=0; i<N3; i++) { | | |
|         padding_word | 16 | bslbf |
|     } | | |
| } | | |

| SYNTAX | NO. OF BITS | MNE-MONIC |
|---|---|---|
| Indexes() { | | |
|     length | 32 | uimsbf |
|     FirstPlayback() { | | |
|         FirstPlayback_object_type | 2 | uimsbf |
|         reserved_for_future_use | 30 | bslbf |
|         if (FirstPlayback_object_type==01$_b$) { | | |
|             HDMV_Title_playback_type | 2 | uimsbf |
|             reserved_for_word_align | 14 | bslbf |
|             FirstPlayback_mobj_id_ref | 16 | uimsbf |
|             reserved_for_future_use | 8*4 | bslbf |
|         } else if (FirstPlayback_object_type==10$_b$) { | | |
|             BD-J_Title_playback_type | 2 | uimsbf |
|             reserved_for_word_align | 14 | bslbf |
|             FirstPlayback_bdjo_file_name | 8*5 | bslbf |
|             reserved_for_word_align | 8 | bslbf |
|         } | | |
|     } | | |
|     TopMenu() { | | |
|         TopMenu_object_type | 2 | uimsbf |
|         reserved_for_future_use | 30 | bslbf |
|         if (TopMenu_object_type==01$_b$) { | | |
|             '01' | 2 | uimsbf |
|             reserved_for_word_align | 14 | bslbf |
|             TopMenu_mobj_id_ref | 16 | uimsbf |
|             reserved_for_future_use | 8*4 | bslbf |
|         } else if (TopMenu_object_type==10$_b$) { | | |
|             '11' | 2 | uimsbf |
|             reserved_for_future_use | 14 | bslbf |
|             TopMenu_bdjo_file_name | 8*5 | bslbf |
|             reserved_for_word_align | 8 | bslbf |
|         } | | |
|     } | | |

Fig. 8B

| number_of_Titles | 16 | uimsbf |
|---|---|---|
| for (title_id=0;<br>    title_id<number_of_Titles;<br>    title_id++) { | | |
|     Title[title_id]() { | | |
|         Title_object_type[title_id] | 2 | uimsbf |
|         Title_access_type[title_id] | 2 | uimsbf |
|         reserved_for_future_use | 28 | bslbf |
|         if (Title_object_type[title_id]==01$_b$) { | | |
|             HDMV_Title_playback_type[title_id] | 2 | uimsbf |
|             reserved_for_word_align | 14 | bslbf |
|             Title_mobj_id_ref[title_id] | 16 | uimsbf |
|             reserved_for_future_use | 8*4 | bslbf |
|         } else if (Title_object_type[title_id]==10$_b$) { | | |
|             BD-J_Title_playback_type[title_id] | 2 | uimsbf |
|             reserved_for_word_align | 14 | bslbf |
|             Title_bdjo_file_name[title_id] | 8*5 | bslbf |
|             reserved_for_word_align | 8 | bslbf |
|         } | | |
|     } | | |
| } | | |
| } | | |

*Fig. 9*

| SYNTAX | NO. OF BITS | MNEMONIC |
|---|---|---|
| xxxxx.mpls { | | |
|     type_indicator | 8*4 | bslbf |
|     version_number | 8*4 | bslbf |
|     PlayList_start_address | 32 | uimsbf |
|     PlayListMark_start_address | 32 | uimsbf |
|     ExtensionData_start_address | 32 | uimsbf |
|     reserved_for_future_use | 160 | bslbf |
|     AppInfoPlayList() | | |
|     for (i=0; i<N1; i++) { | | |
|         padding_word | 16 | bslbf |
|     } | | |
|     PlayList() | | |
|     for (i=0; i<N2; i++) { | | |
|         padding_word | 16 | bslbf |
|     } | | |
|     PlayListMark() | | |
|     for (i=0; i<N3; i++) { | | |
|         padding_word | 16 | bslbf |
|     } | | |
|     ExtensionData() | | |
|     for (i=0; i<N4; i++) { | | |
|         padding_word | 16 | bslbf |
|     } | | |
| } | | |

*Fig. 10*

| SYNTAX | NO. OF BITS | MNEMONIC |
|---|---|---|
| PlayList() { | | |
| length | 32 | uimsbf |
| reserved_for_future_use | 16 | bslbf |
| number_of_PlayItems | 16 | uimsbf |
| number_of_SubPaths | 16 | uimsbf |
| reserved_for_future_use | | |
| for (PlayItem_id=0;<br>    PlayItem_id<number_of_PlayItems;<br>    PlayItem_id++) { | | |
| PlayItem() | | |
| } | | |
| for (SubPath_id=0;<br>    SubPath_id<number_of_SubPaths;<br>    SubPath_id++) { | | |
| SubPath() | | |
| } | | |
| } | | |

Fig. 11

| SYNTAX | NO. OF BITS | MNE- MONIC |
|---|---|---|
| PlayItem() { | | |
|     length | 16 | uimsbf |
|     Clip_Information_file_name[0]   // angle_id=0 | 8*5 | bslbf |
|     Clip_codec_identifier[0] | 8*4 | bslbf |
|     reserved_for_future_use | 11 | bslbf |
|     is_multi_angle | 1 | bslbf |
|     connection_condition | 4 | bslbf |
|     ref_to_STC_id[0] | 8 | uimsbf |
|     IN_time | 32 | uimsbf |
|     OUT_time | 32 | uimsbf |
|     UO_mask_table() | | |
|     PlayItem_random_access_flag | 1 | bslbf |
|     reserved_for_future_use | 7 | bslbf |
|     still_mode | 8 | bslbf |
|     if (still_mode == 0x01){ | | |
|         still_time | 16 | uimsbf |
|     } else { | | |
|         reserved_for_future_use | 16 | bslbf |
|     } | | |
|     if (is_multi_angle==1b) { | | |
|         multi_clip_entries() { | | |
|             number_of_angles | 8 | uimsbf |
|             reserved_for_future_use | 6 | bslbf |
|             is_different_audios | 1 | bslbf |
|             is_seamless_angle_change | 1 | bslbf |
|             for (angle_id = 1;  // Note; angles except angle id=0 | | |
|                 angle_id<number_of_angles; angle_id++) { | | |
|                 Clip_Information_file_name[angle_id] | 8*5 | bslbf |
|                 Clip_codec_Identifier[angle_id] | 8*4 | bslbf |
|                 ref_to_STC_id[angle_id] | 8 | uimsbf |
|             } | | |
|         } | | |
|     } | | |
|     STN_table() | | |
| } | | |

Fig. 12

| SYNTAX | NO. OF BITS | MNEMONIC |
|---|---|---|
| zzzzz.clpi { | | |
|     type_indicator | 8*4 | bslbf |
|     version_number | 8*4 | bslbf |
|     SequenceInfo_start_address | 32 | uimsbf |
|     ProgramInfo_start_address | 32 | uimsbf |
|     CPI_start_address | 32 | uimsbf |
|     ClipMark_start_address | 32 | uimsbf |
|     ExtensionData_start_address | 32 | uimsbf |
|     reserved_for_future_use | 96 | bslbf |
|     ClipInfo() | | |
|     for (i=0; i<N1; i++) { | | |
|         padding_word | 16 | bslbf |
|     } | | |
|     SequenceInfo() | | |
|     for (i=0; i<N2; i++) { | | |
|         padding_word | 16 | bslbf |
|     } | | |
|     ProgramInfo() | | |
|     for (i=0; i<N3; i++) { | | |
|         padding_word | 16 | bslbf |
|     } | | |
|     CPI() | | |
|     for (i=0; i<N4; i++) { | | |
|         padding_word | 16 | bslbf |
|     } | | |
|     ClipMark() | | |
|     for (i=0; i<N5; i++) { | | |
|         padding_word | 16 | bslbf |
|     } | | |
|     ExtensionData() | | |
|     for (i=0; i<N6; i++) { | | |
|         padding_word | 16 | bslbf |
|     } | | |
| } | | |

Fig. 13

| SYNTAX | NO. OF BITS | MNE-MONIC |
|---|---|---|
| ExtensionData() { | | |
|     length | 32 | uimsbf |
|     if(length !=0){ | | |
|         data_block_start_address | 32 | uimsbf |
|         reserved_for_word_align | 24 | bslbf |
|         number_of_ext_data_entries | 8 | uimsbf |
|         for (i=0; i<*number_of_ext_data_entries*; i++) { | | |
|             ext_data_entry() { | | |
|                 ID1 | 16 | uimsbf |
|                 ID2 | 16 | uimsbf |
|                 ext_data_start_address | 32 | uimsbf |
|                 ext_data_length | 32 | uimsbf |
|             } | | |
|         } | | |
|         for (i=0; i<L1; i++) { | | |
|             padding_word | 16 | bslbf |
|             padding_word | 16 | bslbf |
|         } | | |
|         data_block() | 32+ 8*(length - data_block_start _address) | |
|     } | | |
| } | | |

*Fig. 15*

| SYNTAX | NO. OF BITS | MNEMONIC |
|---|---|---|
| IndexExtData(){ | | |
|     type_indicator | 8*4 | uimsbf |
|     reserved | 8*4 | bslbf |
|     reserved_for_future_use | 224 | bslbf |
|     UIAppInfoRecording() | | |
| } | | |

Fig. 16

| SYNTAX | NO. OF BITS | MNEMONIC |
|---|---|---|
| UIAppInfoRecording() { | | |
|     length | 32 | uimsbf |
|     maker_ID | 16 | uimsbf |
|     maker_model_code | 16 | uimsbf |
|     reserved_for_future_use | 15 | bslbf |
|     write_protect_flag | 1 | bslbf |
|     ref_to_thumbnail_index | 16 | uimsbf |
|     time_zone | 8 | bslbf |
|     record_time_and_date | 4*14 | bslbf |
|     reserved_for_future_use | 7 | bslbf |
|     character_set | 8 | bslbf |
|     name_length | 8 | uimsbf |
|     name | 8*255 | bslbf |
| } | | |

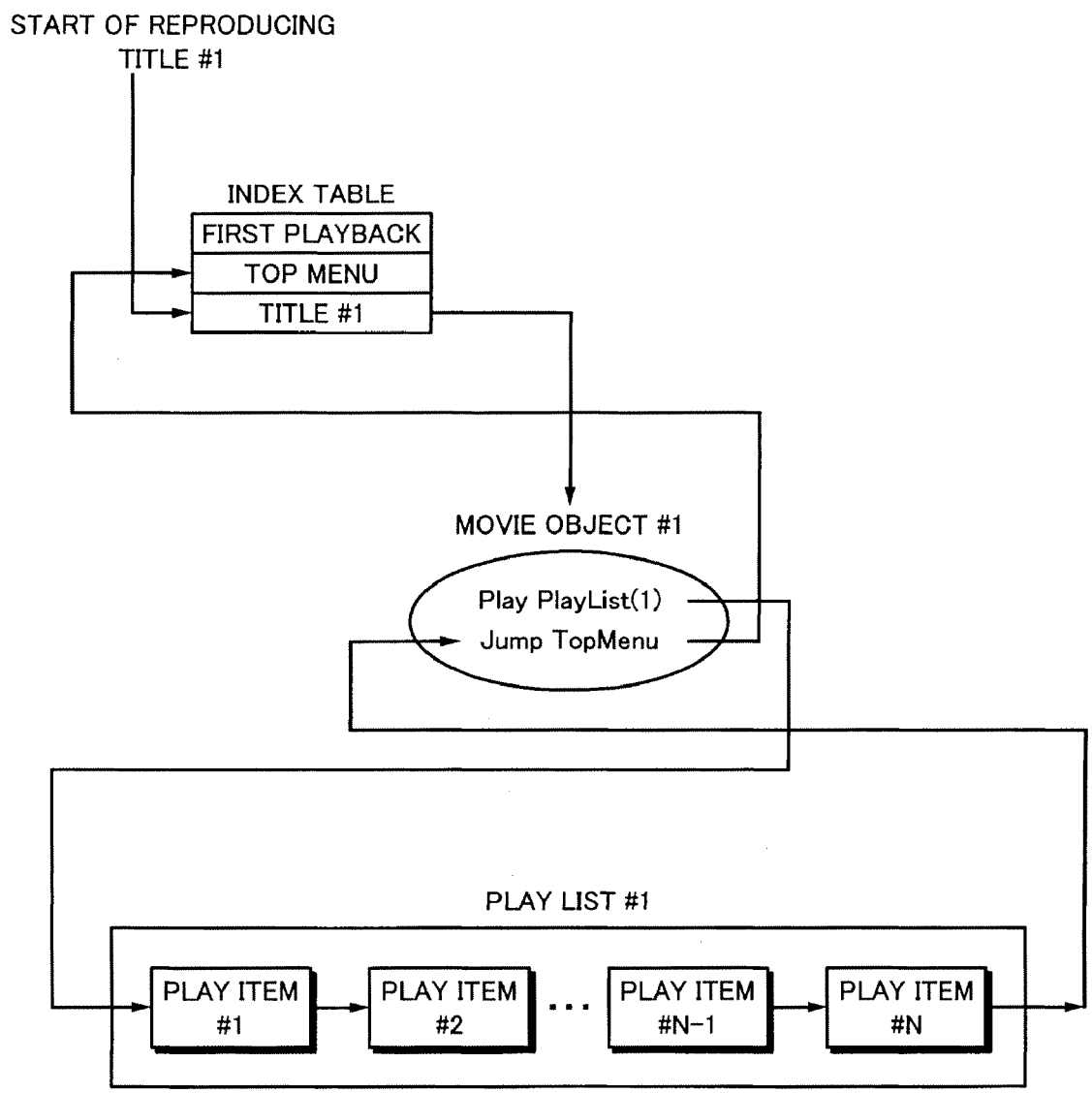

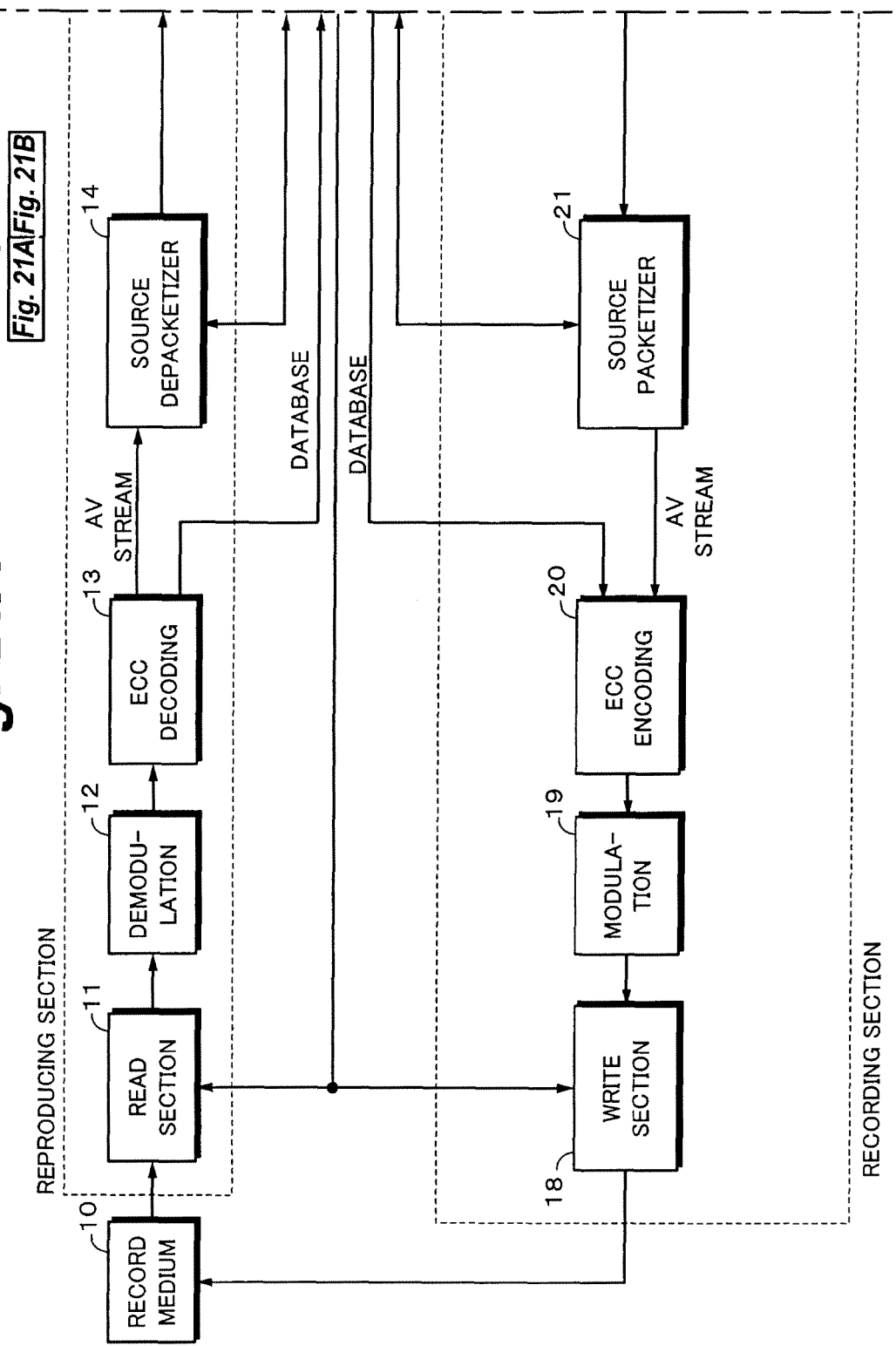

DATA STRUCTURE, RECORDING APPARATUS, REPRODUCING APPARATUS, PROGRAM, AND RECORD MEDIUM

CROSS REFERENCES TO RELATED APPLICATIONS

The present invention contains subject matter related to Japanese Patent Application JP 2005-377879 filed in the Japanese Patent Office on Dec. 28, 2005, the entire contents of which being incorporated herein by reference.

BACKGROUND OF THE INVENTION

1. Field of the Invention

The present invention relates to a data structure and a record medium applicable to a large capacity record medium such as a Blu-ray disc. In particular, the present invention relates to a data structure, a recording apparatus, a reproducing apparatus, a program, and a record medium that allow a format of a reproduction-only record medium to be applied to a recordable record medium.

2. Description of the Related Art

In recent years, as a standard for a disc type record medium that is recordable and detachable from a recording and reproducing apparatus, Blu-ray disc standard has been proposed. In the Blu-ray disc standard, as a record medium, a disc having a diameter of 12 cm and a cover thickness of 0.1 mm is used. As an optical system, a blue-purple laser having a wavelength of 405 nm and an objective lens having an aperture of 0.85 are used. With this structure, the Blu-ray disc standard accomplishes a record capacity of 27 gigabytes (GB) (max). Thus, on a Blu-ray disc, a Japanese broadcasting satellite (BS) digital high-vision broadcast program can be recorded for two hours or longer without deterioration of picture quality.

As sources of audio/video (AV) signals recorded on recordable optical discs, analog signals of for example regular analog television broadcasts and digital signals of for example BS digital broadcasts have been expected. In the Blu-ray disc standard, standards that define recording methods of these broadcasts have been established.

On the other hand, as derivative standards of the current Blu-ray disc standard, the development of reproduction-only record mediums on which movies, music, and so forth are pre-recorded are being actively performed. As disc shaped record mediums on which movies and music are recorded, digital versatile discs (DVDs) have been widespread. A reproduction-only optical disc based on the Blu-ray disc standard has a large capacity, a high speed transfer rate, and so forth and can contain a high-vision picture for two hours or longer with high picture quality. Thus, the Blu-ray disc is largely different from the current DVD and superior thereto in these features.

In the following, the standard of a reproduction-only record medium based on the Blu-ray disc standard is referred to as the Blu-ray Disc-Read Only Memory (BD-ROM) standard. On the other hand, the standard of a recordable record medium based on the Blu-ray disc standard is referred to as the BD-RE standard.

For a recordable record medium, it is necessary to provide an area for information unique to a recording apparatus in a data structure defined in the format. In the foregoing BD-RE standard, as exemplified in Japanese Patent Application Laid-Open No. 2002-157859 (referred to as patent document 1), this area is defined as data block MakersPrivateData( ).

SUMMARY OF THE INVENTION

DVD recorders that record audio/video (AV) data to a recordable DVD based on Digital Versatile Disc-Video (DVD-Video) standard defined for existing reproduction-only record mediums have been widespread. Thus, it is expected that the BD-ROM standard developed as a standard for reproduction-only record mediums will be used as one of recording formats of home-use recorders in future.

However, since the BD-ROM standard was expected to be used for pre-authorized reproduction-only discs, there is no area for information unique to a recording apparatus.

In addition, if an area for information unique to a recording apparatus is simply added to the BD-ROM standard, compatibility with the existing BD-ROM standard would be lost.

In view of the foregoing, it would be desirable to provide a data structure, a recording apparatus, a reproducing apparatus, a program, and a record medium that allow the BD-ROM standard to be extended to recordable record mediums, compatibility with the existing BD-ROM standard to be maintained, and information unique to a recording apparatus to be recorded.

According to an embodiment of the present invention, there is provided a data structure having at least content data and reproduction control information with which reproduction of the content data is controlled. The data structure includes an index table, an object, a play list, and clip information. With the index table, reproduction of content data is managed. The object is called to the index table and represents a method of reproducing at least the content data. The play list is called from the object. The clip information is called based on the play list and represents attribute information of at least the content data. At least the index table, the play list, and the clip information each are capable of containing extension data. The extension data contain main identification information and sub identification information as identification information which identities the extension data.

According to an embodiment of the present invention, there is provided a recording apparatus which records at least content data and reproduction control information with which reproduction of the content data is controlled to a record medium. The recording apparatus includes a recording section. The recording section records to the record medium an index table with which reproduction of content data is managed, an object which is called to the index table and which represents a method of reproducing at least the content data, a play list called from the object, and clip information which is called based on the play list and which represents attribute information of at least the content data. At least the index table, the play list, and the clip information each are capable of containing extension data. The extension data contain main identification information and sub identification information as identification information which identities the extension data.

According to an embodiment of the present invention, there is provided a recording method of recording at least content data and reproduction control information with which reproduction of the content data is controlled to a record medium. An index table with which reproduction of content data is managed, an object which is called to the index table and which represents a method of reproducing at least the content data, a play list called from the object, and clip information which is called based on the play list and which represents attribute information of at least the content data are recorded to the record medium. At least the index table, the play list, and the clip information each are capable of containing extension data. The extension data contain main identification information and sub identification information as identification information which identities the extension data.

According to an embodiment of the present invention, there is provided a record program which causes a computer device to execute a recording method of recording at least content data and reproduction control information with which reproduction of the content data is controlled to a record medium. An index table with which reproduction of content data is managed, an object which is called to the index table and which represents a method of reproducing at least the content data, a play list called from the object, and clip information which is called based on the play list and which represents attribute information of at least the content data are recorded to the record medium. At least the index table, the play list, and the clip information each are capable of containing extension data. The extension data contain main identification information and sub identification information as identification information which identities the extension data.

According to an embodiment of the present invention, there is provided a reproducing apparatus which produces data from a record medium on which at least content data and reproduction control information with which reproduction of the content data is controlled have been recorded. The reproducing apparatus includes a reproducing section and an extension data extracting section. The reproducing section reproduces data from the record medium on which an index table with which reproduction of content data is managed, an object which is called to the index table and which represents a method of reproducing at least the content data, a play list called from the object, and clip information which is called based on the play list and which represents attribute information of at least the content data have been recorded. The extension data extracting section extracts extension data from the data reproduced by the reproducing section. At least the index table, the play list, and the clip information each are capable of containing the extension data. The extension data contain main identification information and sub identification information as identification information which identities the extension data.

According to an embodiment of the present invention, there is provided a reproducing method of reproducing data from a record medium on which at least content data and reproduction control information with which reproduction of the content data is controlled have been recorded. Data are read from the record medium on which an index table with which reproduction of content data is managed, an object which is called to the index table and which represents a method of reproducing at least the content data, a play list called from the object, and clip information which is called based on the play list and which represents attribute information of at least the content data have been recorded. Extension data are extracted from the data reproduced at the reproducing step. At least the index table, the play list, and the clip information each are capable of containing the extension data. The extension data contain main identification information and sub identification information as identification information which identities the extension data.

According to an embodiment of the present invention, there is provided a reproducing process which causes a computer device to execute a reproducing method of reproducing data from a record medium on which at least content data and reproduction control information with which reproduction of the content data is controlled have been recorded. Data are reproduced from the record medium on which an index table with which reproduction of content data is managed, an object which is called to the index table and which represents a method of reproducing at least the content data, a play list called from the object, and clip information which is called based on the play list and which represents attribute information of at least the content data have been recorded. Extension data are extracted from the data reproduced at the reproducing step. At least the index table, the play list, and the clip information each are capable of containing the extension data. The extension data contain main identification information and sub identification information as identification information which identities the extension data.

According to an embodiment of the present invention, there is provided a record medium on which at least content data and reproduction control information with which reproduction of the content data is controlled are recorded as a data structure. The data structure includes an index table, an object, a play list, and clip information. With the index table, reproduction of content data is managed. The object is called to the index table and represents a method of reproducing at least the content data. The play list is called from the object. The clip information is called based on the play list and represents attribute information of at least the content data. At least the index table, the play list, and the clip information each are capable of containing extension data. The extension data contain main identification information and sub identification information as identification information which identities the extension data.

According to an embodiment of the present invention, in a data structure having at least content data and reproduction control information with which reproduction of the content data is controlled. The data structure includes an index table, an object, a play list, and clip information. With the index table, reproduction of content data is managed. The object is called to the index table and represents a method of reproducing at least the content data. The play list is called from the object. The clip information is called based on the play list and represents attribute information of at least the content data. At least the index table, the play list, and the clip information each are capable of containing extension data. The extension data contain main identification information and sub identification information as identification information which identities the extension data. Thus, the record format of a reproduction-only record medium is applicable to a recordable record medium.

According to an embodiment of the present invention, when at least content data and reproduction control information with which reproduction of the content data is controlled are recorded to a record medium, an index table with which reproduction of content data is managed, an object which is called to the index table and which represents a method of reproducing at least the content data, a play list called from the object, and clip information which is called based on the play list and which represents attribute information of at least the content data are recorded to the record medium. At least the index table, the play list, and the clip information each are capable of containing extension data. The extension data contain main identification information and sub identification information as identification information which identities the extension data. Thus, the record format used for a reproduction-only record medium is applicable as the record format of a recordable record medium.

According to an embodiment of the present invention, when data are reproduced from a record medium on which at least content data and reproduction control information with which reproduction of the content data is controlled have been recorded, data are read from the record medium on which an index table with which reproduction of content data is managed, an object which is called to the index table and which represents a method of reproducing at least the content data, a play list called from the object, and clip information which is called based on the play list and which represents attribute information of at least the content data have been recorded. Extension data are extracted from the data reproduced at the reproducing step. At least the index table, the play list, and the clip information each are capable of containing the extension data. The extension data contain main identification information and sub identification information as identification information which identies the extension data. Thus, when data are reproduced from a recordable record medium in which data have been recorded in a record format of a reproduction-only record medium, information unique to a recording apparatus is obtainable According to an embodiment of the present invention, in a record medium on which at least content data and reproduction control information with which reproduction of the content data is controlled are recorded as a data structure, the data structure includes an index table, an object, a play list, and clip information. With the index table, reproduction of content data is managed. The object is called to the index table and represents a method of reproducing at least the content data. The play list is called from the object. The clip information is called based on the play list and represents attribute information of at least the content data. At least the index table, the play list, and the clip information each are capable of containing extension data. The extension data contain main identification information and sub identification information as identification information which identies the extension data. Thus, a record medium can be used regardless of whether it is reproduction-only or recordable.

According to an embodiment of the present invention, An index table, an object, a play list, and clip information are included. With the index table, reproduction of content data is managed. The object is called to the index table and represents a method of reproducing at least the content data. The play list is called from the object. The clip information is called based on the play list and represents attribute information of at least the content data. At least the index table, the play list, and the clip information each are capable of containing extension data. The extension data contain main identification information and sub identification information as identification information which identies the extension data. Thus, the record format of a reproduction-only record medium is applicable to a recordable record medium.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 7 is a schematic diagram showing syntax representing an example of the structure of file "index.bdmv";

FIG. 8 is a schematic diagram showing syntax representing an example of the structure of block indexes( );

FIG. 9 is a schematic diagram showing syntax representing an example of the structure of movie play list file "xxxxx.mpls";

FIG. 10 is a schematic diagram showing syntax representing an example of the structure of block PlayList( );

FIG. 11 is a schematic diagram showing syntax representing an example of the structure of block PlayItem( );

FIG. 12 is a schematic diagram showing syntax representing an example of the structure of a clip information file;

FIG. 13 is a schematic diagram showing syntax representing an example of the structure of block ExtensionData( );

FIG. 15 is a schematic diagram more specifically describing block data_block( );

FIG. 16 is a schematic diagram more specifically describing block data_block( );

FIG. 20 is a flow chart showing an operation of the BD virtual player; and

DETAILED DESCRIPTION OF THE PREFERRED EMBODIMENTS

Next, with reference to the accompanying drawings, an embodiment of the present invention will be described. For easy understanding of an embodiment of the present invention, a management structure of content, namely audio and video (AV) data, recorded on a BD-ROM as a read-only type Blu-ray disc, defined in "Blu-ray Disc Read Only Format Ver 1.0 part 3 Audio Visual Specification" for Blu-ray discs, will be described. In the following, the management structure of the BD-ROM is referred to as the BDMV format.

A bit stream encoded according to encoding systems, for example the Moving Pictures Experts Group (MPEG) video and the MPEG audio, and multiplexed according to the MPEG2 system is referred to as a clip AV stream (or an AV stream). A clip AV stream is recorded as a file on a disc according to a file system defined in "Blu-ray Disc Read Only Format part 2", which is one of standards for Blu-ray discs. This file is referred to as a clip AV stream file (or an AV stream file).

A clip AV stream file is a management unit on a file system. Thus, the user may not be able to easily understand a clip AV stream file as a management unit. From a view point of user's friendliness, it is necessary to provide a mechanism of combining a plurality of AV stream files of video content into one file and reproducing the combined file and a mechanism of reproducing only a part of clip AV stream files. In addition, it is necessary to record a database that contains information allowing a special reproduction operation and a cue point reproduction operation to be smoothly performed on a disc. "Blu-ray Disc Read Only Format part 3", which is one of standards for Blu-ray discs, defines this database.

Figure 1:
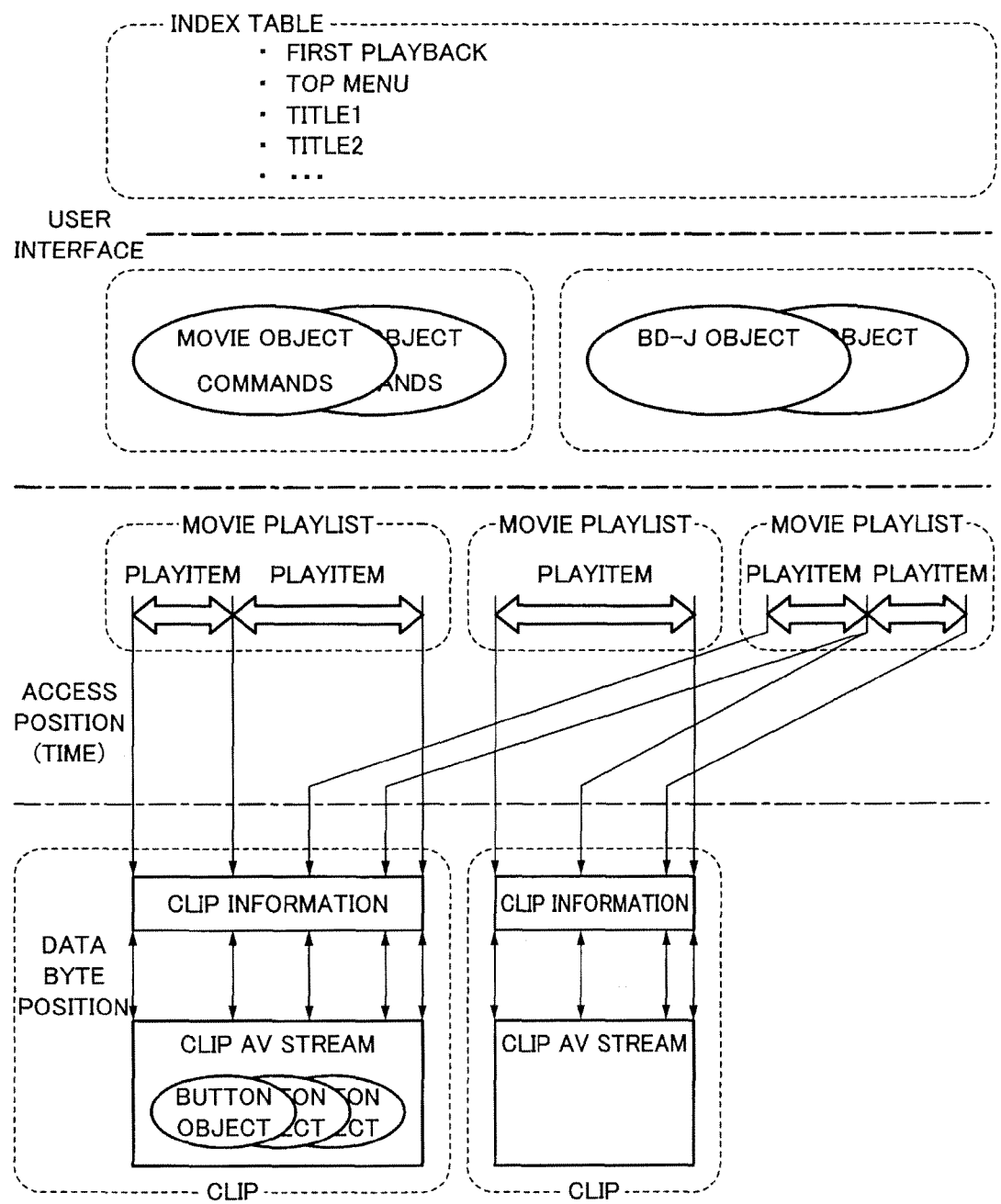
FIG. 1 is a schematic diagram showing a data model of a BD-ROM.

FIG. 1 shows an outline of a data model of a BD-ROM. As shown in FIG. 1, a BD-ROM is composed of four hierarchical layers. The lowest layer is a layer on which a clip AV stream is placed (for convenience, hereinafter this layer is referred to as the clip layer). Placed above the clip layer is a layer on which a movie play list (Move PlayList), with which a reproduction position of a clip AV stream is designated, and a play item (PlayItem) (for convenience, hereinafter this layer is referred to as the play list layer). Placed above the play list layer is a layer on which a movie object (Movie Object) composed of commands that designate the reproduction order of move play lists and so forth (for convenience, hereinafter this layer is referred to as the object layer). The highest layer is a layer on which an index table with which titles and so forth recorded on the BD-ROM are managed (for convenience, hereinafter this layer is referred to as the index layer).

Next, the clip layer will be described. A clip AV stream is a bit stream of which video data and audio data have been multiplexed for example according to the MPEG2 transport stream (TS) format. Information about the clip AV stream is recorded as clip information in a file.

In addition, a presentation graphics (PG) stream as a graphics stream for subtitle and an interactive graphics (IG) stream as a stream of data for a menu have been multiplexed into the clip AV stream. The interactive graphics is for example button images for example used for a menu. In FIG. 1, the interactive graphics is shown as button objects.

A pair of a clip AV stream file and a clip information file that contains clip information corresponding to the clip AV stream file is treated as an object and referred to as a clip. In other words, one clip is an object composed of a clip AV stream and clip information.

A file is generally treated as a sequence of bytes. Contents of a clip AV stream file are mapped on the time base. An entry point of a clip is mainly designated on the time base. When a time stamp of an access point to a predetermined clip is given, a clip information file can be used to find out address information with which data are read from the clip AV stream file.

Next, the play list layer will be described. A movie play list designates an AV stream file to be reproduced. A movie play list is composed of pairs of a reproduction start point (IN point) and a reproduction end point (OUT point) with which a reproduction portion of a designated AV stream file is designated. A pair of the reproduction start point and the reproduction end point is referred to as a play item (PlayItem). A movie play list is composed of a set of play items. When a play item is reproduced, a part of an AV stream file referred by the play item is reproduced. In other words, a region of a clip is reproduced on the basis of information of an IN point and an OUT point of a play item.

Next, the object layer will be described. A movie object contains terminal information that associates an HDMV navigation command program (HDMV program) with a move object. An HDMV program is a command that controls reproduction of a play list. The terminal information contains information with which a user's BD-ROM player is permitted to be interactively operated. User's operations such as a menu screen call operation and a title search operation are controlled on the basis of terminal information.

A BD-J object is composed of an object based on a Java program (Java is a registered trademark of Sun Microsystems, Inc.). Since a BD-J object is not closely related to an embodiment of the present invention, its detailed description will be omitted.

Next, the index layer will be described. The index layer is composed of an index table. The index table is a table in the top level that defines titles of the BD-ROM disc. A module manager of BD-ROM resident system software controls reproduction of data from the BD-ROM disc on the basis of title information contained in the index table.

Figure 2:
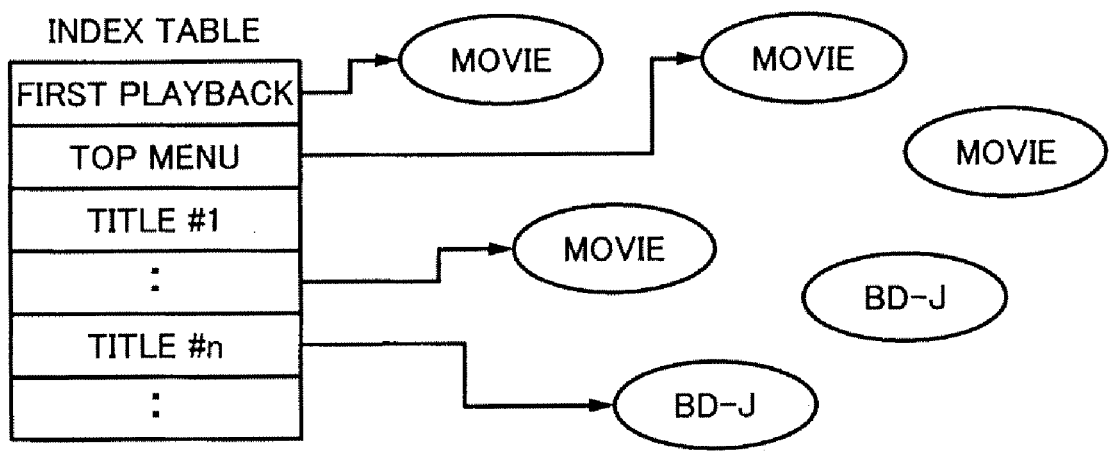
FIG. 2 is a schematic diagram describing an index table.

In other words, as schematically shown in FIG. 2, entries in the index table are referred to as titles. A first playback, a top menu, title #1, title #2, and so forth, which are entries in the index table, are all titles. Each title represents a link to a movie object or a BD-J object. Each title represents either an HDMV title or a BD-J title.

When content recorded on the current BD-ROM is a movie, the first playback is an advertisement picture (trailer) for a movie company. The first playback is followed by a main part of the movie. When content is a movie, the top menu is a menu screen on which for example the main part of the movie is reproduced, a chapter search operation is performed, subtitle and/or language are selected, and a bonus picture is reproduced. A title is a picture selected from the top menu. A title may be a menu screen.

Figure 3:
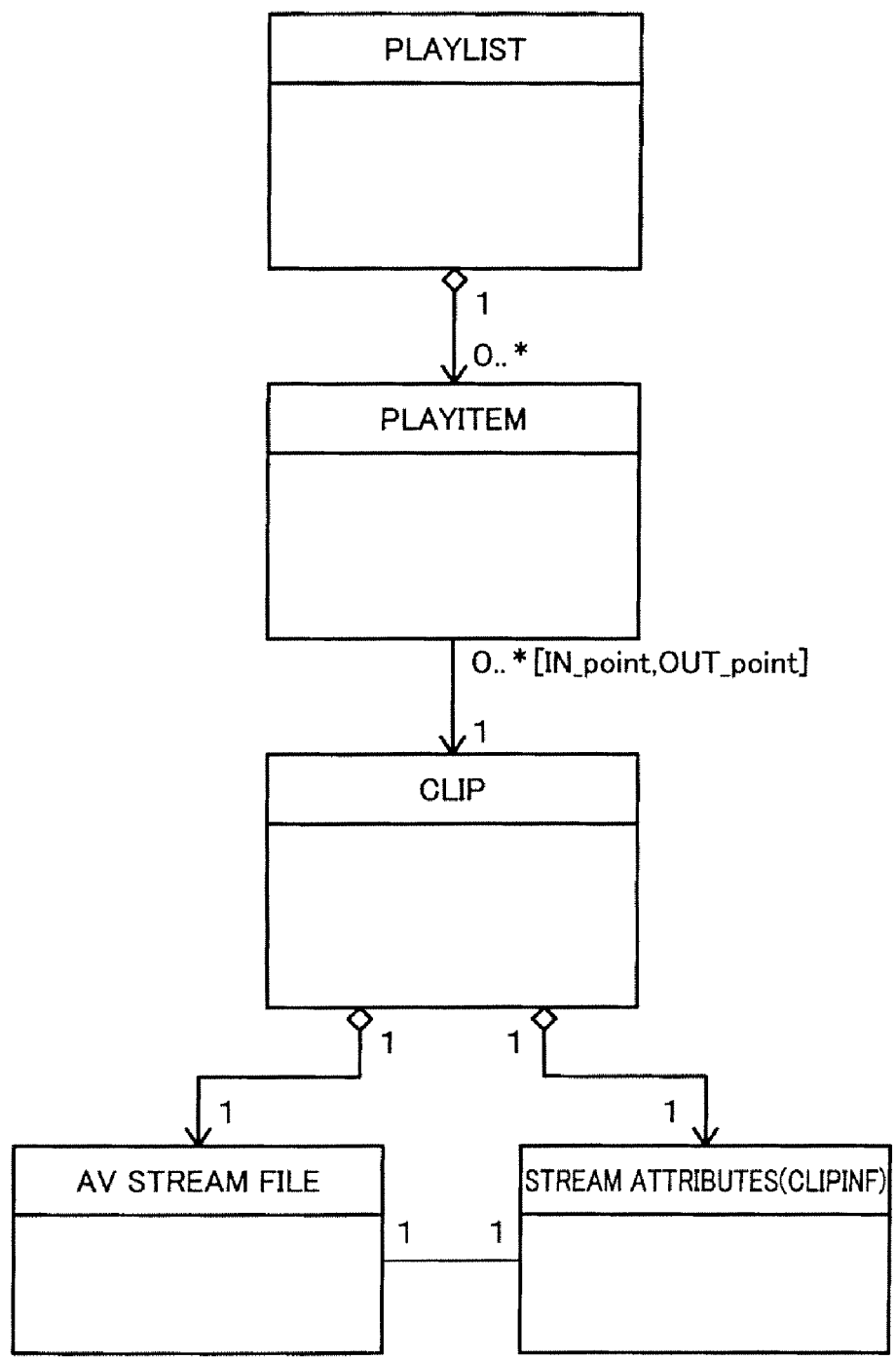
FIG. 3 is an UML chart showing the relationship of a clip AV stream, clip information, a clip, a play item, and a play list.

FIG. 3 is a unified modeling language (UML) chart showing the relationship of the foregoing clip AV stream, clip information (stream attributes), clip, play item, and play list. A play list is correlated with one or a plurality of play items. A play item is correlated with one clip. One clip can be correlated with a plurality of play items having a different start point and/or a different end point. One clip references one clip AV stream file. Likewise, one clip references one clip information file. One clip AV stream file is just correlated with one clip information file. With such a structure defined, a reproduction order can be non-destructively designated to reproduce only a desired portion without necessity of changing clip AV stream files.

Figure 4:
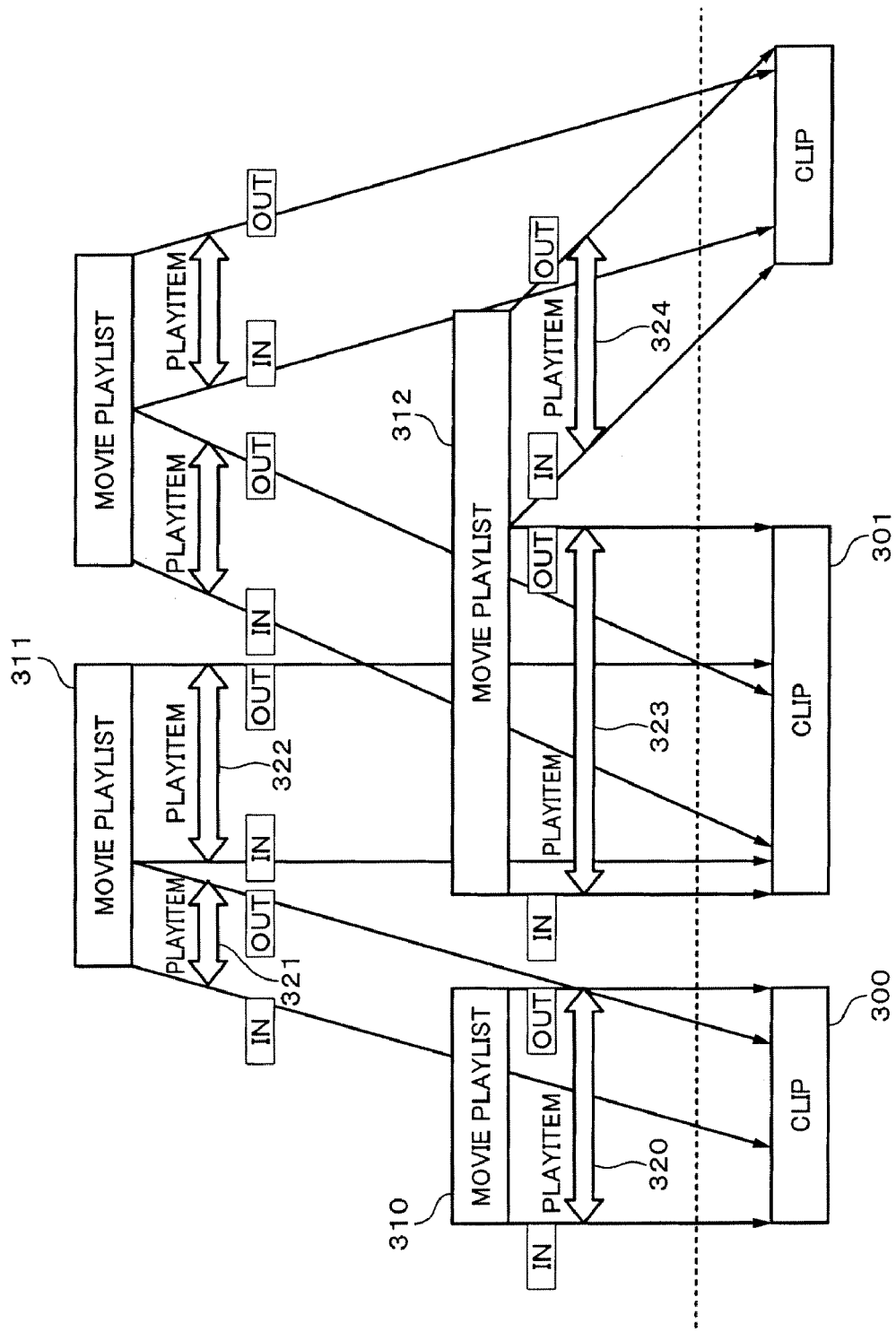
FIG. 4 is a schematic diagram describing a method of referencing the same clip from a plurality of play lists.

In addition, as shown in FIG. 4, the same clip can be referenced from a plurality of play lists. In addition, a plurality of clips can be designated from one play list. A clip is referenced with an IN point and an OUT point of a play item in a play list. In the example shown in FIG. 4, a clip 300 is referenced from a play item 320 of a play list 310. In addition, the clip 300 is referenced for a region designated by an IN point and an OUT point of a play item 321 of a play list 311 that has the play item 321 and a play item 322. In addition, a clip 301 is referenced for a region designated by an IN point and an OUT point of the play item 322 of the play list 312. In addition, the clip 301 is referenced for a region designated by an IN point and an OUT point of a play item 323 of a play list 312 that has the play item 323 and a play item 324.

Figure 5:
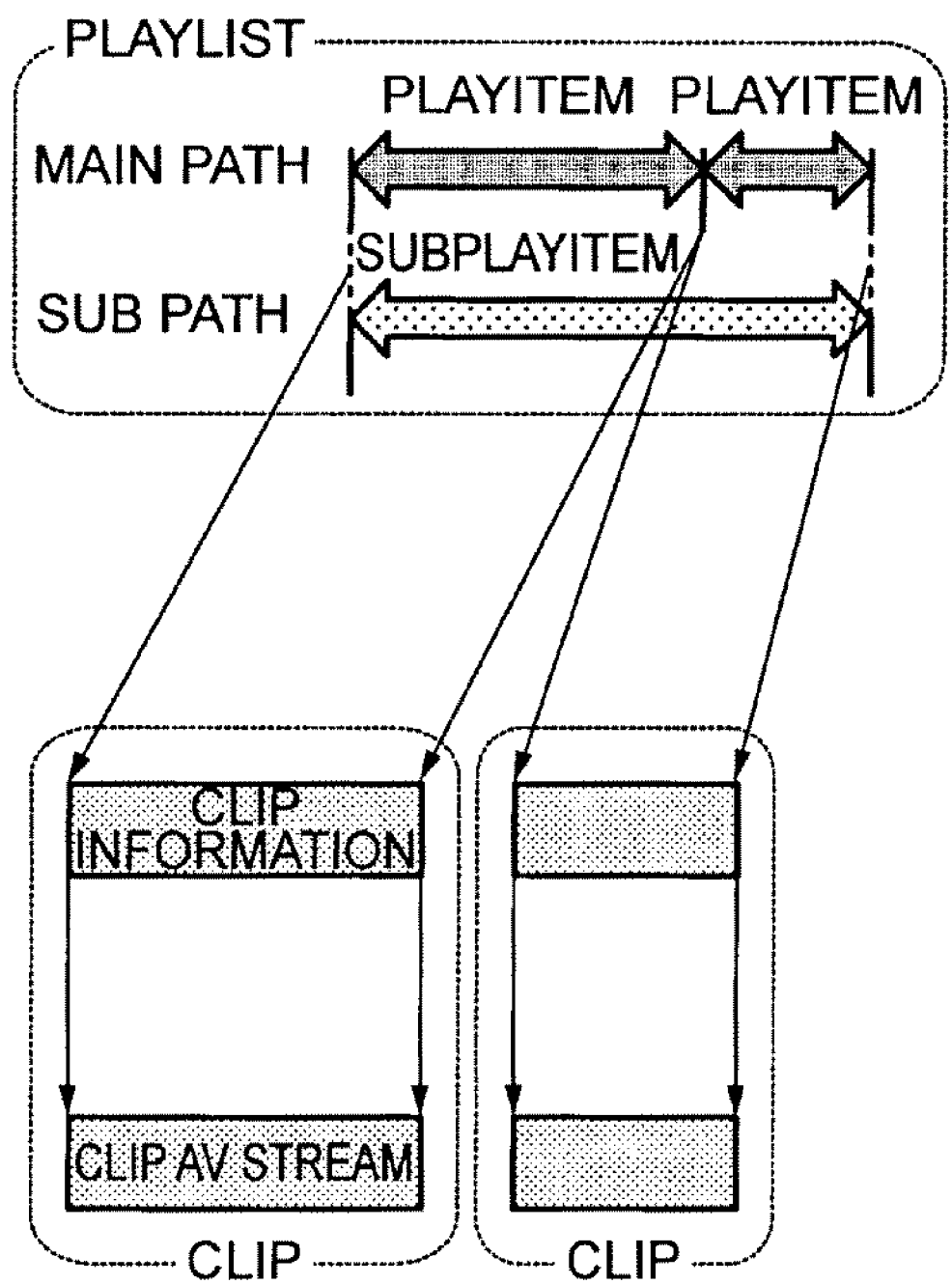
FIG. 5 is a schematic diagram describing a sub path.

As exemplified in FIG. 5, a play list can have a sub path corresponding to a sub play item against a main path corresponding to a play item that is mainly reproduced. For example, a play list can have a play item for after-record audio as a sub play item. When a predetermined condition is satisfied, a play list can have a sub play item (details will be omitted).

Figure 6:
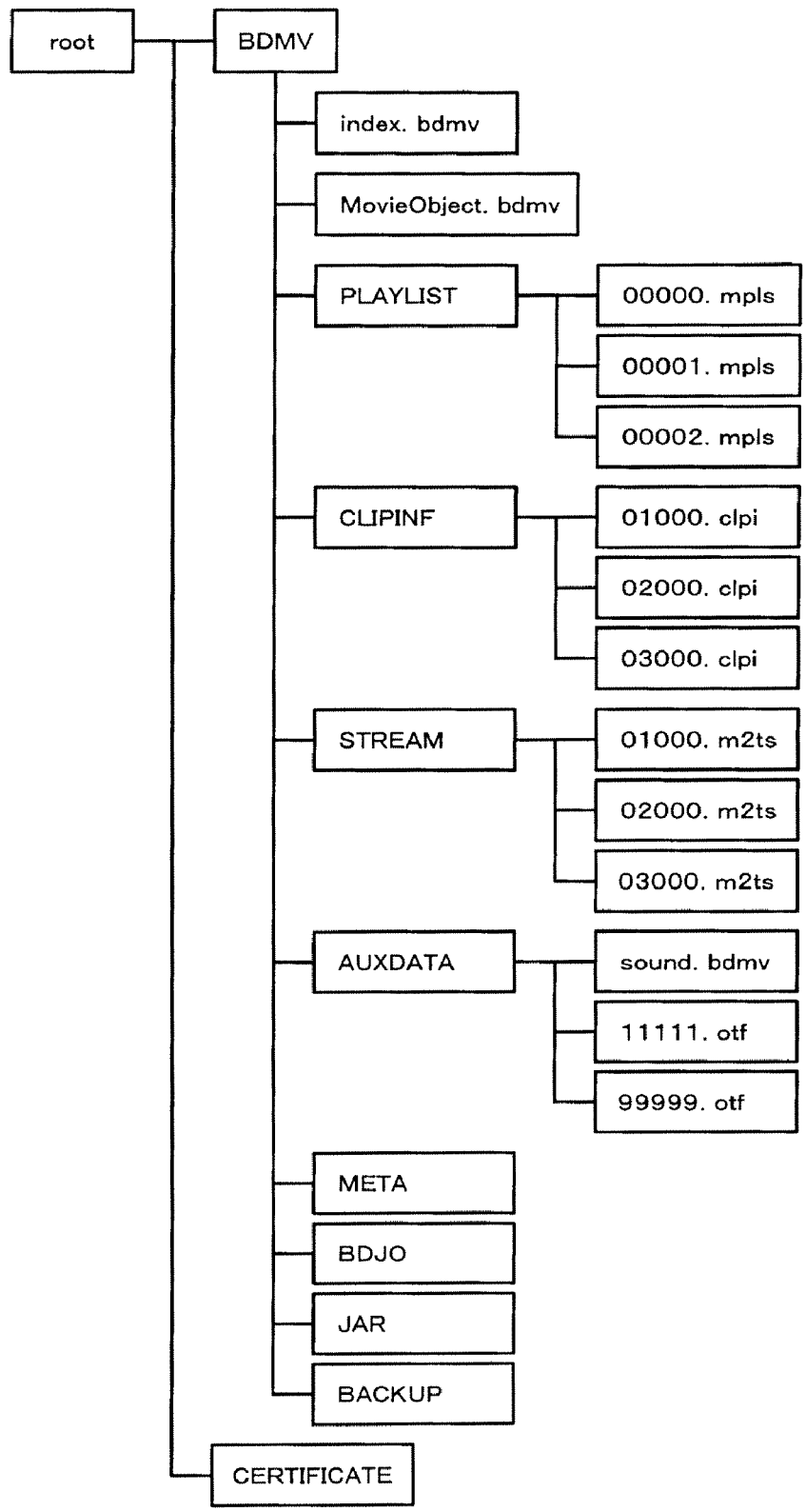
FIG. 6 is a schematic diagram describing a management structure of files recorded on a record medium.

Next, with reference to FIG. 6, the management structure for files on a BD-ROM, defined in "Blu-ray Disc Read Only Format part 13", will be described. Files are hierarchically managed with a directory structure. One directory (in FIG. 6, a root directory) is created on the record medium. One recoding and reproducing system manages files placed below the root directory.

Placed below the root directory are directory "BDMV" and directory "CERTIFICATE". Placed in directory "CERTIFICATE" is information about copyright. Placed in directory "BDMV" is the data structure described with reference to FIG. 1.

Placed immediately below directory "BDMV" may be only two files "index.bdmv" and "MovieObject". Placed below directory "BDMV" are directory "PLAYLIST", directory "CLIPINF", directory "STREAM", directory "AUXDATA", directory "META", directory "BDJO", directory "JAR", and directory "BACKU".

File "index.bdmv" contains the contents of directory "BDMV". In other words, this file "index.bdmv" corresponds to the index table in the foregoing index layer, which is the highest layer File "MovieObject.bdmv" contains information about at least one movie object. In other words, file "MovieObject.bdmv" corresponds to the foregoing object layer.

Directory "PLAYLIST" is a directory in which the database of play lists is placed. In other words, directory "PLAYLIST" contains file "xxxxx.mpls" that is a file of a movie play list. File "xxxxx.mpls" is a file created for each movie play list. In the file name, "xxxxx" followed by a "." (period) is a five-digit number. "mpls" preceded by the period is an extension fixed to this type of file.

Directory "CLIPINF" is a directory in which the database of clips is placed. In other words, directory "CLIPINF" contains file "zzzzz.clpi" that is a clip information file corresponding to a clip AV stream file. In the file name, "zzzzz" followed by a "." (period) is a five-digit number. "clpi" preceded by the period is an extension fixed to this type of file.

Directory "STREAM" is a directory in which an AV stream file as an entity is placed. In other words, directory "STREAM" contains a clip AV stream file corresponding to a clip information file. A clip AV stream file is composed of a Moving Pictures Experts Group 2 (MPEG2) transport stream (hereinafter abbreviated as an MPEG2 TS). The file name of a clip AV stream file is "zzzzz.m2ts". When "zzzzz" followed by the period of the file name of the clip AV stream file is the same as that of the corresponding clip information file, their relationship can be easily grasped.

Directory "AUXDATA" contains a sound file, a font file, a font index file, a bit map file, and so forth with which a menu and so forth are displayed. File "sound.bdmv" contains sound data associated with an application of an HDMV interactive graphics stream. The file name of sound data is fixed to "sound.bdmv". File "aaaaa.otf" contains font data used for subtitle, the foregoing BD-J application, and so forth. In the file name, "aaaaa" followed by the period is a five-digit number. "otf" preceded by the period is an extension fixed to this type of file. File "bdmv.fontindex" is an index file of fonts.

Directory "META" contains a meta data file. Directory "BDJO" and directory "JAR" contain files associated with the foregoing BD-J objects. Directory "BACKUP" contains backups of the foregoing directories and files. Since directory "META", directory "BDJO", directory "JAR", and directory "BACKUP" are not closely related to an embodiment of the present invention, their detailed description will be omitted.

Next, each of these files will be described in detail. First of all, file "index.bdmv", which is placed immediately below directory "BDMV", will be described. FIG. 7 shows syntax representing an example of the structure of file "index.bdmv". In this example, syntax is described on the basis of syntax of C language, which is used as a programming language for computer devices and so forth. This applies to drawings that show syntax of other files.

In FIG. 7, field type_indicator has a data length of 32 bits and denotes that this file is the index table. Field version_number has a data length of 32 bits and represents the version of file "index.bdmv". Field "indexes_start_address" has a data length of 32 bits and represents the start address of block indexes( ) in this syntax.

Field ExtensionData_start_address has a data length of 32 bits and represents the start address of block Extension Data( ) of this syntax. Field ExtensionData_start_address represents the start address of block ExtensionData( ) as the relative number of bytes from the first byte of file "index.bdmv". The relative number of bytes starts with "0". When the value of field ExtensionData_start_address is "0", it denotes that file "index.bdmv" does not contain block Extension Data( ).

Field ExtensionData_start_address is followed by an area that has a data length of 192 bytes and is reserved for future extension. Block AppInfoBDMV( ) is a block in which the content creator can describe any information and does not affect the operation of the player.

Block indexes( ) is substantial contents of file "index.bdmv". When the disc is loaded into the player, the first playback is reproduced and a title (a movie object or a BD-J object) is called from the top menu corresponding to the contents contained in file "index.bdmv". In the following description, movie objects and BD-J objects are collectively referred to as movie objects or the like. A movie play list file (that will be described later) is read according to a command contained in a movie object or the like called from the index table.

FIG. 8 shows syntax representing an example of the structure of block indexes( ). Field length has a data length of 32 bits and represents the data length immediately after field length to the end of block indexes( ). Field length is followed by block FirtPlayback( ) and block TopMenu( ).

Block FirstPlayback( ) contains information about an object used in the first playback. The first field of block FirstPlayback( ) is field FirstPlayback_object_type. Field FirstPlayback_object_type has a data length of 2 bits and denotes that an object used in the first playback is a move object or a BD-J object.

When the value of field FirstPlayback_Object_type is "01" (in binary notation), an object used in the first playback is determined to be a movie object. In this case, an if statement is followed by field HDMV_Title_playback_type and field Firstplaybak_mob_j_idref. Field HDMV_Title_playback_type has a data length of 2 bits and represents the reproduction type of an HDMV title. Field Firstplayback_mobj_id_ref has a data length of 16 bits and represents the ID of a movie object used in the first playback.

When the value of field FirstPlayback_object_type is "10" (in binary notation), an object used in the first playback is determined to be a BD-J object. In this case, an else if statement is followed by field BD-J_Title_playback_type and field Firstplayback_bdjo_file_name. Field BD-J_Title_playback_type has a data length of 2 bits and represents the reproduction type of a BD-J title. Field Firstplaybak_bdjo_file_name has a data length of 40 bits (5 bytes) and represents the file name of a BD-J object used in the first playback.

Block TopMenu( ) contains information about an object used in the top menu. Field TopMenu_object_type has a data length of 2 bits and denotes that an object used in the top menu is a movie object or a BD-J object.

When the value of field TopMenu_object_type is "01" (in binary notation), an object used in the top menu is determined to be a movie object. In this case, an if statement is followed by field "01" and field TopMenu_mobj_id_ref. Field "01" has a data length of 2 bits. Field TopMenu_mobj_id_ref has a data length of 16 bits and represents the ID of a movie object used in the top menu.

When the value of field TopMenu_object_type is "10" (in binary notation), an object used in the top menu is determined to be a BD-J object. In this case, an else if statement is followed by field "10" and field TopMenu_bdjo_file_name. Field "10" has a data length of 2 bits. Field Topmenu_bdjo_file_name has a data length of 40 bits (5 bytes) and represents the file name of a BD-J object used in the top menu.

Block Topmenu( ) is followed by field number_of_Titles. Field number_of_Titles has a data length of 16 bits and represents the number of titles called from the top menu. Field number_of_Titles is followed by a for statement. The for statement is followed by blocks of Title[title_id]( ) corresponding to the value of field number_of_Titles. Block Title [title_id]( ) contains information about each title. Argument title_id is a numeric value in the range from "0" to the value represented by field number_of_Titles and identifies a title.

In Title[title_id]( ), field Title_object_type has a data length of 2 bits and denotes that an object used in the title is a movie object or a BD-J object. Field Title_access_type denotes the access type of an object used in the tile.

When the value of field Title_object_type is "01" (in binary notation), an object used in the title is determined to be a movie object. In this case, an if statement is followed by field HDMV_Title_playback_type and field Title_mobj_id_ref. Field HDMV_Title_playback_type has a data length of 2 bits and represents the reproduction type of the tile. Field Title_mobj_id_ref has a data length of 16 bits and represents the ID of a movie object used in the title.

When the value of field Title_object_type is "10" (in binary notation), an object used in the title is determined to be a BD-J object. In this case, an else if statement is followed by field BD-J_title_playback_type and field Title_bdjo_file_name. Field BD-J_Title_playback_type has a data length of 2 bits and represents the reproduction type of the title. Field Title_bdjo_file_name has a data length of 40 bits (5 bytes) and represents the file name of a BD-J object used in the title.

FIG. 9 shows syntax representing an example of the structure of movie play list file "xxxxx.mpls". Field type_indicator has a data length of 32 bits (4 bytes) and denotes that the file is a movie play list file. Field version_number has a data length of 32 bits (4 bytes) and represents the version of this movie play list file. Field PlayList_start_address has a data length of 32 bits and represents the start address of block PlayList( ) in this syntax. Field PlayListMark_start_address has a data length of 32 bits and represents the start address of block PlayMark( ) in this syntax.

Field ExtensionData_start_address has a data length of 32 bits and represents the start address of block Extension Data( ) in this syntax. Field ExtensionData_start_address represents the start address of block ExtensionData( ) as the relative number of bytes from the first byte of file "xxxxx.mpls". The relative number of bytes starts with "0". When the value of field ExtensionData_start_address is "0", it denotes that file "xxxxx.mpls" does not contain block Extension Data( ).

Block AppInfoPlayList( ) contains information such as a type, reproduction restriction, and so forth of a play list contained in the next block PlayList( ). Block PlayList( ) contains a play list. Block PlayListMark( ) contains a point to be jumped for example by chapter jump. Block Extension Data( ) contains data according to an embodiment of the present invention.

FIG. 10 shows syntax representing an example of the structure of block PlayList( ). Field length has a data length of 32 bits and represents the data length immediately after field length to the end of block PlayList( ). Field length is followed by an area that has a data length of 16 bits and is reserved for future extension. Field number_of_PlayItems has a data length of 16 bits and represents the number of play items contained in block PlayList ( ). Field number_of_SubPath represents the number of sub paths contained in block PlayList( ).

Field number_of_SubPath is followed by a for statement. The for statement is followed by blocks of PlayItem( ) corresponding to the value of field number_of_PlayItems. The count number on the basis of the for statement becomes identifier PlayItem_id of block PlayItem( ). Block PlayItem( ) is followed by another for statement. The for statement is followed by blocks of SubPath( ) corresponding to the value of field number_of_SubPath. The count value on the basis of the for statement becomes identifier SubPath_id of block SubPath( ).

Besides audio data used for the foregoing after recording, when two images are combined, a sub path can be used to designate a sub image to be reproduced in synchronization with a clip designated with a play item.

FIG. 11 shows syntax representing an example of the structure of block PlayItem( ). Field length has a data length of 16 bits and represents the data length immediately after field length to the end of block PlayItem( ).

Field Clip_Information_file_name[0] has a data length of 40 bits (5 bytes) and represents the file name of a clip information file that block PlayItem( ) references. In this play item, a clip information file having the file name represented by field Clip_Information_file_name[0] is read. Field Clip_codec_identification[0] has a data length of 32 bits and represents the codec system of a clip AV stream used in a play item of block PlayItem( ).

Field clip_codec_identifier[0] is followed by an area that has a bit length of 11 bits and is reserved for future extension. Flag is_multi_angle has a data length of 1 bit and represents whether multi-angle is applicable. Field connection_condition has a data length of 4 bits and represents information about connection state. Field ref_to_STC_id[0] has a data length of 8 bits and represents information about discontinuity of a system time base (STC).

Field IN_time and field OUT_time each have a data length of 32 bits and represent the reproduction range of a main clip AV stream. Field IN_time represents the start point, whereas field OUT_time represents the end time.

Field U0_mask_table( ) is a table for which user input restriction is set. Flag PlayItem_random_access_flag has a data length of 1 bit and represents whether a play item of block PlayItem( ) is permitted to be randomly accessed. Flag PlayItem_random_access_flag is followed by an area that has a data length of 7 bits and is reserved for future extension.

Field still_mode has a data length of 8 bits and represents whether the last displayed picture of a play item of block PlayItem( ) is caused to be displayed as a still image. When the value of field still_mode is "0x01" (in binary notation), an if statement is followed by field still_time. Field still_time has a data length of 16 bits and represents a time period of the still image. When the value of field still_mode is not "0x01", the area having a data length of 16 bits is determined to be reserved for future extension.

When the value of flag is_multi_angle is "1", which denotes that multi-angle is applicable, an if statement is followed by a structure that manages multi-angle. Since multi-angle is not closely related to an embodiment of the present invention, its description will be omitted.

Block STN_table( ) manages the attribute, the PID number, the record position on the record medium, and so forth of a clip AV stream managed by a play item of block PlayItem( ).

FIG. 12 shows syntax representing an example of the structure of a clip information file. Field type_indicator has a data length of 32 bits (4 bytes) and denotes that this file is a clip information file. Field version_number has a data length of 32 bits (4 bytes) and represents the version of this clip information file.

This clip information file has block clipinfo( ), block SequenceInfo( ), block ProgramInfo( ), block CPI( ), and Block ClipMark( ), and block ExtensionData( ). Field ProgramInfo_start_address, field ProgramInfo_start_address, field CPI_start_address, field ClipMark_start_address, and field ExtensionData_start_address each have a data length of 32 bits and represent the start address of the corresponding block.

Field ExtensionData_start_address represents the start address of block ExtensionData( ) as the relative number of bytes from the first byte of the clip information file. The relative number of bytes starts with "0". When the value of field ExtensionData_start_address is "0", it denotes that file "index.bdmv" does not contain block ExtensionData( ).

Block ClipInfo( ) is preceded by these fields, which represents their start address, and an area that has a data length of 96 bits and that is reserved for future extension. Block ClipInfo( ) contains information about a clip AV stream that this clip information file manages. Block ClipInfo( ) manages for example the number of source packets of a clip AV stream that the clip information file manages, information representing the type of the clip AV stream, information representing the maximum record rate, and so forth.

Block SequenceInfo( ) contains information that collectively manages a sequence whose STC or ATC (Arrival Time Base) is successive. Block ProgramInfo( ) contains information about the codec type (for example MPEG2 system or MPEG4 AVC system) on which a clip AV stream that the clip information file manages has been recorded is based, the aspect ratio of video data in the clip AV stream, and so forth.

Block CPI( ) contains information about characteristic point information (CPI) that represents a feature position of an AV stream such as a random access start point. Block ClipMark( ) contains an index point (jump point) for cueing added to a clip such as a chapter position. Block ExtensionData( ) contains data according to an embodiment of the present invention.

Next, block ExtensionData( ) defined according to an embodiment of the present invention will be described. As described above, block ExtensionData( ) can be placed in file "index.bdmv", which contains an index table, file "xxxxx.mpls", which contains a play list, and clip information file "zzzzz.clpi".

FIG. 13 shows syntax representing an example of the structure of block ExtensionData( ). Field length has a data length of 32 bits and represents the data length immediately after field length to the end of block ExtensionData( ) as the number of bytes. When the data length of field length is not "0", an if statement is followed by the following statements.

Field data_block_start_address has a data length of 32 bits and represents the start address of block data_block( ) containing the main body of extension data ext_data as the relative number of bytes from the start address of block ExtensionData( ). In other words, the relative number of bytes starts with "0". It is necessary for field data_block_start_address to satisfy the following 32-bit alignment condition.

data_block_start_address % 4=0

Field number_of_ext_data_entries has a data length of 8 bits and represents the number of entries of extension data contained in block data_block( ) of block ExtensionData( ). Entries of extension data contain information about the main body of extension data. More specifically, entries of extension data are block ext_data_entry( ) composed of for example field ID1, field ID2, field ext_data_start_address, and field ext_data_length. In block ExtensionData( ), there are blocks of ext_data_entry( ) corresponding to the value of field number_of_ext_data_entries of block ExtensionData( ).

Field ID1 is main identification information that has a data length of 16 bits and that is identification information representing first information identifying extension data ext_data. Field ID1 represents for example a group or an organization that has defined extension data ext_data. The value of field ID1 is assigned by a licenser of format specifications including block ExtensionData( ).

When a disc on which this data structure has been recorded is a BD-ROM standard disc, an organization that has defined the BD-ROM standard assigns a value to field ID1. When a video camera records this data structure to a recordable disc such as a BD-RE standard disc, an organization that has defined the standard applied to the video camera assigns a value to field ID1.

The types of extension data may be thought to change depending on organizations that assign a value to field ID1. In the foregoing example, the type of data necessary for the BD-ROM standard is different from that for video camera standard. In other words, it can be said that an organization that assigns a value to field ID1 is correlated with the type of data extended by an entry (block ext_data_entry( )) of extension data that contain field ID1.

Field ID2 is sub identification information that has a data length of 16 bits and that is identification information representing second information identifying extension data ext_data. Field ID2 represents identification information that identifies the type of data corresponding to the value of field ID1, defined by a group or an organization that field ID1 represents or identification information that uniquely identifies data. A licensee that has been permitted to use a standard containing block ExtensionData( ) describing field ID2 or a licenser of the standard specifications assigns a value to field ID2.

More specifically, field ID2 identifies an application of data contained in block data_block( ) corresponding to an entry (block ext_data_entry( )) of extension data that contain field ID2. As described above, block ExtensionData( ) that defines and contains extension data may be placed in index file "index.bdmv", play list file "xxxxx.mpls", and clip information file "zzzzz.clpi". An application of extension data can correspond to a file that contains for example extension data.

For example, field ID1 denotes that extension data used in the BD-ROM standard have been recorded, whereas field ID2 is used to distinguish data that defines a display position of a sub image combined with a picture used in the BD-ROM standard from data combined with sound.

Thus, when identification information that identifies extension data is managed by separating it into main identification information represented by field ID1 and sub identification information represented by field ID2, contents of extension data can be quickly grasped. In addition, when data about a group or an organization that has defined extension data is recorded in field ID1, a data structure having expandability that can handle future extension of the logical format can be provided.

Field ID1 and field ID2 may be able to be assigned different values for each entry (block ext_data_entry( )) that contains field ID1 and field ID2. One block ExtensionData( ) can contain two or more blocks of ext_data_entry( ) whose field ID1 and field ID2 are different.

Field ext_data_start_address has a data length of 32 bits and represents the start address of extension data ext_data corresponding to an entry (block ext_data_entry( )) of extension data that contain field ext_data_start_address. Field ext_data_start_address represents the start address of extension data ext_data as the relative number of bytes from the first byte of block ExtensionData( ). It is necessary for field ext_data_start_address to satisfy the following 32-bit alignment condition.

data_block_start_address % 4=0

Field ext_data_length has a data length of 32 bits and represents the data length of extension data ext_data corresponding to an entry (block ext_data_entries( )) of extension data that contain field ext_data_start_address. The data length is represented in bytes.

When entries (blocks of ext_data_entry ( )) of extension data are contained corresponding to the value of field number_of_ext_data_entries, two fields of padding_word having a data length of 16 bits and is composed of any data sequence are repeated the number of times L1. Thereafter, block data_block( ) that contains the main body of extension data is contained. Block data_block( ) contains at least one entry of extension data ext_data. Each entry of extension data ext_data is extracted from block data_block( ) on the basis of field ext_data_start_address and field ext_data_length.

Figure 14:
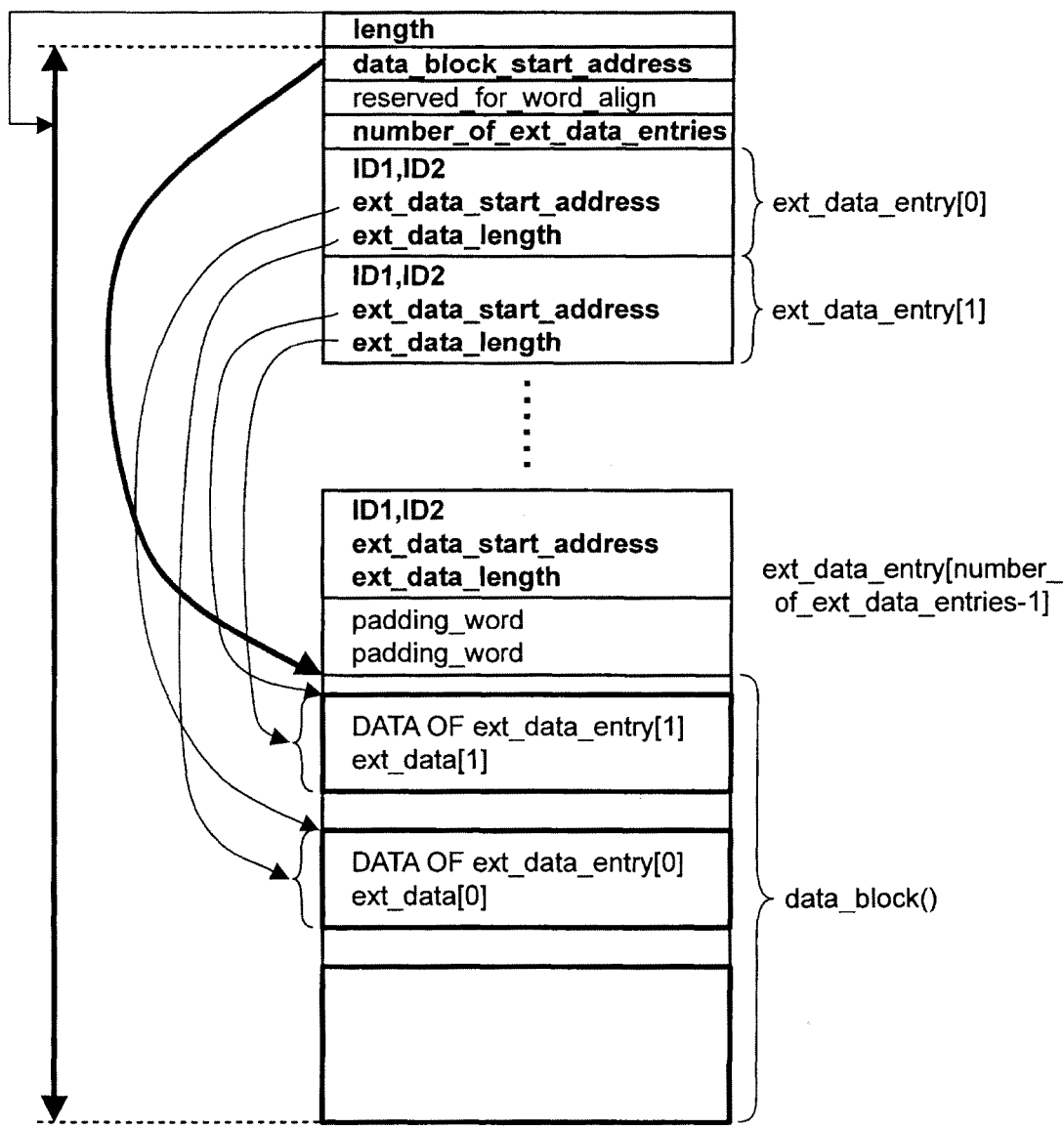
FIG. 14 is a schematic diagram showing the relationship of reference of each piece of data of block ExtensionData( )

FIG. 14 shows the relationship of which each data entry of block ExtensionData( ) is referenced. Field length represents the data length from the position immediately after field length to the end of block ExtensionData( ). Field data_block_ start_address represents the start position of block data_block( ). Blocks ext_data_entry are contained corresponding to the value of field number_of_ext_data_entries. Field padding_word having any length is placed between block ext_data_entry as the last block and block data_block( ).

Block data_block( ) contains extension data ext_data represented by block ext_data_entry( ). The position and data length of each entry of extension data ext_data are represented by field ext_data_start_address and field ext_data_length in the corresponding block of ext_data_entry( ). Thus, the order of entries of extension data ext_data in block data_block( ) may not match the order of corresponding entries of ext_data_entry( ).

Since extension data are composed of two layers of block data_block( ), which contains the main body of extension data, and block ext_data_entry( ), which contains access information for extension data of block data_block( ) and so forth, a plurality of types of extension data can be contained.

Next, with reference to FIG. 15 and FIG. 16, a specific example of block data_block( ) will be described. In this example, it is assumed that a recordable Blu-ray disc according to the BD-RE standard is used and an AV stream is recorded on the disc by a recorder. In this example, various types of information necessary for the recorder, for example a recorder name, a disc name, a record date, a record time, and write protection information, are contained as extension data in block ExtensionData( ). Thus, data about a recording apparatus can be added to a data structure defend as a reproduction-only disc.

Next, the case of which information that allows an index file to be extended is contained in block ExtensionData( ) of index file "index.bdmv" will be described. First of all, with reference to FIG. 13, "00x1000" and "0x0100" are assigned to the value of field ID1 and the value of field ID2, respectively. The values of field ID1 and field ID2 are identified by referencing a table stored in a read-only memory (ROM) of the reproducing apparatus.

As exemplified in FIG. 15, block IndexExData( ) that extends an index file is contained in an area starting from the position of block data_block( ) represented by field ext_data_start_address. In block IndexExtData( ), field type_indicator contains a four-character sting, representing the type of data that follow, encoded according to the International Organization for Standardization (ISO) 646. In the example shown in FIG. 15, four-character string "INDEX" encoded according to the ISO 646 system is contained in field type_indicator and the next data are data UIAppInfoRecording that represents attribute information about recording.

Field type_indicator is followed by a reserved area having a data length of 32 bits and a reserved area for future expansion having a data length of 224 bits. The reserved area for future extension is followed by block UIAppInfo Recording( ) that contains data UIAppInfoRecording.

FIG. 16 shows syntax representing an example of the structure of block UIAppInfoRecording( ). Field length has a data length of 32 bits and represents the data length immediately after field length to the end of block UIAppInfoRecording in bytes. Field maker_ID has a data length of 16 bits and represents the manufacturer of the recording apparatus that last recorded and/or updated data containing the extension data. Field marker_model_code has a data length of 16 bits and represents the model name of the recording apparatus that last recorded and/or updated data containing the extension data.

Flag write_protect_flag has a data length of 1 bit and represents whether data containing the extension data are permitted to be rewritten. When for example value "1" has been assigned to this flag write_protect_flag, it is determined that the recording apparatus be not permitted to rewrite data containing the extension data. When value "0" has been assigned to this flag write_protect_flag, it is determined that the recording apparatus be permitted to rewrite data containing the extension data.

Field ref_to_thumbnail_index has a data length of 16 bits and designates a representative image that represents data containing the extension data as an image. Field time_zone has a data length of 8 bits and represents the time zone of a time at which data containing the extension data were recorded. Field record_time_and_date has a data length of 56 bits (4 bits×14) and represents the date and time on and at which data containing the extension data were recorded.

Field record_time_and_date is followed by a reserved area having a data length of 7 bits. The reserved area is followed by field character_set. Field character_set has a data length of 8 bits and represents a character set of a character string contained in field name. Field name_length has a data length of 8 bits and represents the effective data length from the beginning of the next field name. Field name represents the name of data containing the extension data. Field name represents for example the disc name. Field name has a fixed data length (8 bits×255). Field name can contain up to 255 single-byte characters. A character string having the data length represented by field name_length from the beginning of filed name is an effective character string.

Figure 17:
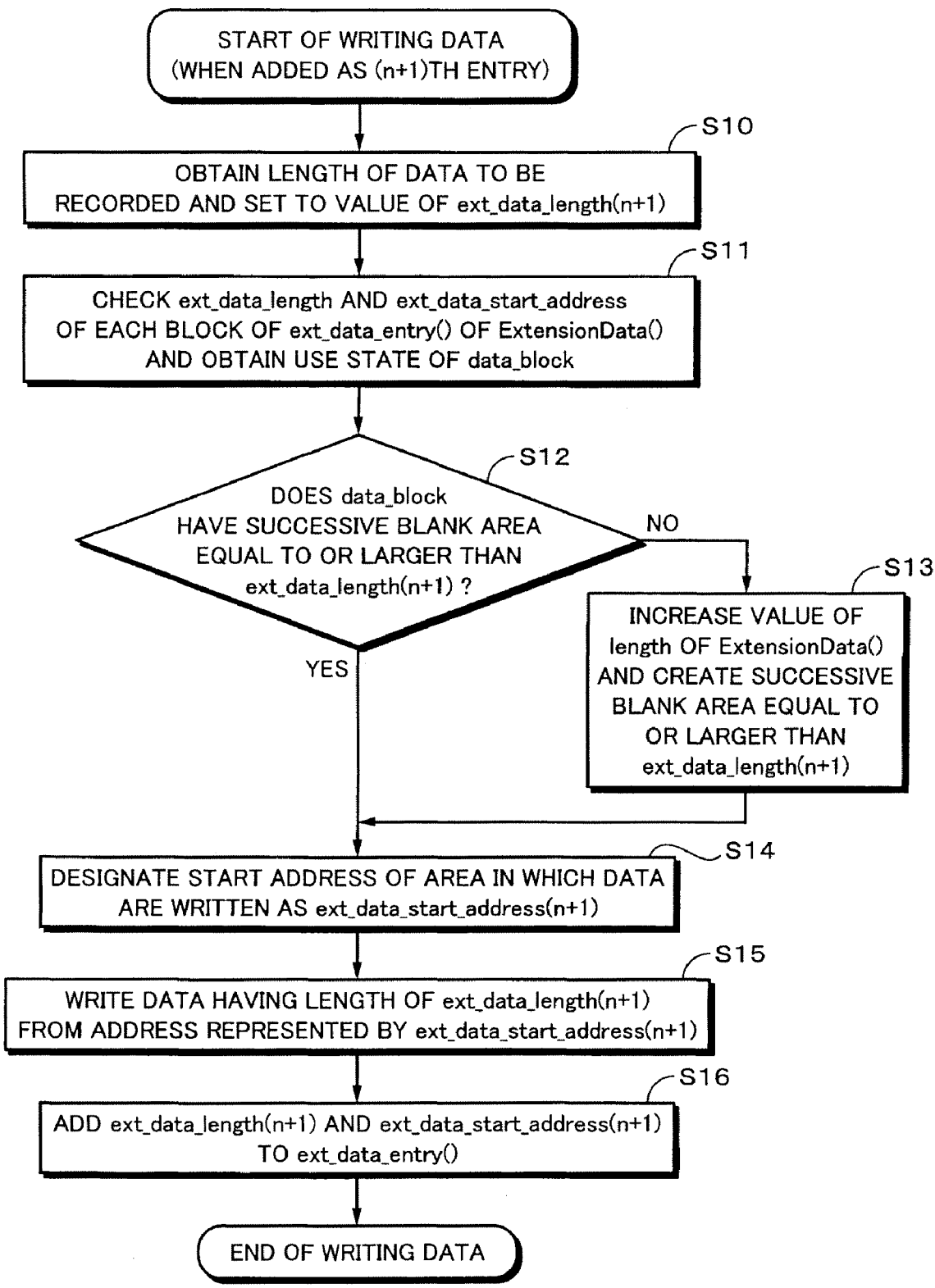
FIG. 17 is a flow chart showing an example of a process of writing data as extension data to block ExtensionData( )

Next, a method of creating extension data and a method of reading extension data according to an embodiment of the present invention will be described. FIG. 17 is a flow chart showing an example of a process of writing data to block ExtensionData( ) defined to index file "index.bdmv", play list file "xxxxx.mpls", and clip information file "zzzzz.clpi". FIG. 17 shows an example of which by adding extension data as an (n+1)-th entry of block ExtensionData( ), block ExtensionData( ) is rewritten.

First of all, at step S10, the data length of extension data to be written is obtained and the obtained value is set to field ext_data_length. Notation "[n+1]" corresponds to an (n+1)-th entry number. Next, at step S11, the values of field ext_data_length and field ext_data_start_address of each block of ext_data_entry( ) of the current block ExtensionData( ) are checked. As a result, the use state of block data_block( ) is obtained.

Next, at step S12, it is determined whether block data_block( ) has a successive blank area equal to or larger than the data length represented by field ext_data_length[n+1], which is the data length of extension data to be written. When the determined result denotes that block data_block( ) has such a successive blank area, the flow advances to step S14.

In contrast, when the determined result denotes that block data_block( ) does not have such a successive blank area, the flow advances to step S13. At step S13, by increasing the value of field length of block ExtensionData( ), a successive blank area equal to or larger than the data length represented by field ext_data_length[n+1] is formed in block data_block( ). After the blank area has been formed, the flow advances to step S14.

At step S14, the start address of an area to which extension data are written is designated as field ext_data_start_address [n+1]. Next, at step S15, extension data ext_data[n+1] having the length represented by field ext_data_length[n+1] that has been set at step S10 is written from field ext_data_start_address[n+1].

After data have been written, flow advances to step S16. At step S16, field ext_data_length[n+1] and field ext_data_start_address[n+1] are added to block ext_data_entry( ).

In the foregoing description, it is assumed that block ExtensionData( ) to be rewritten has been read from a record medium such as a disc and then stored in a memory of a recording apparatus. Thus, the extension of block ExtensionData( ) due to a change of the value of field length is performed by the system. In other words, the system properly reallocates the memory of the recording apparatus.

Figure 18:
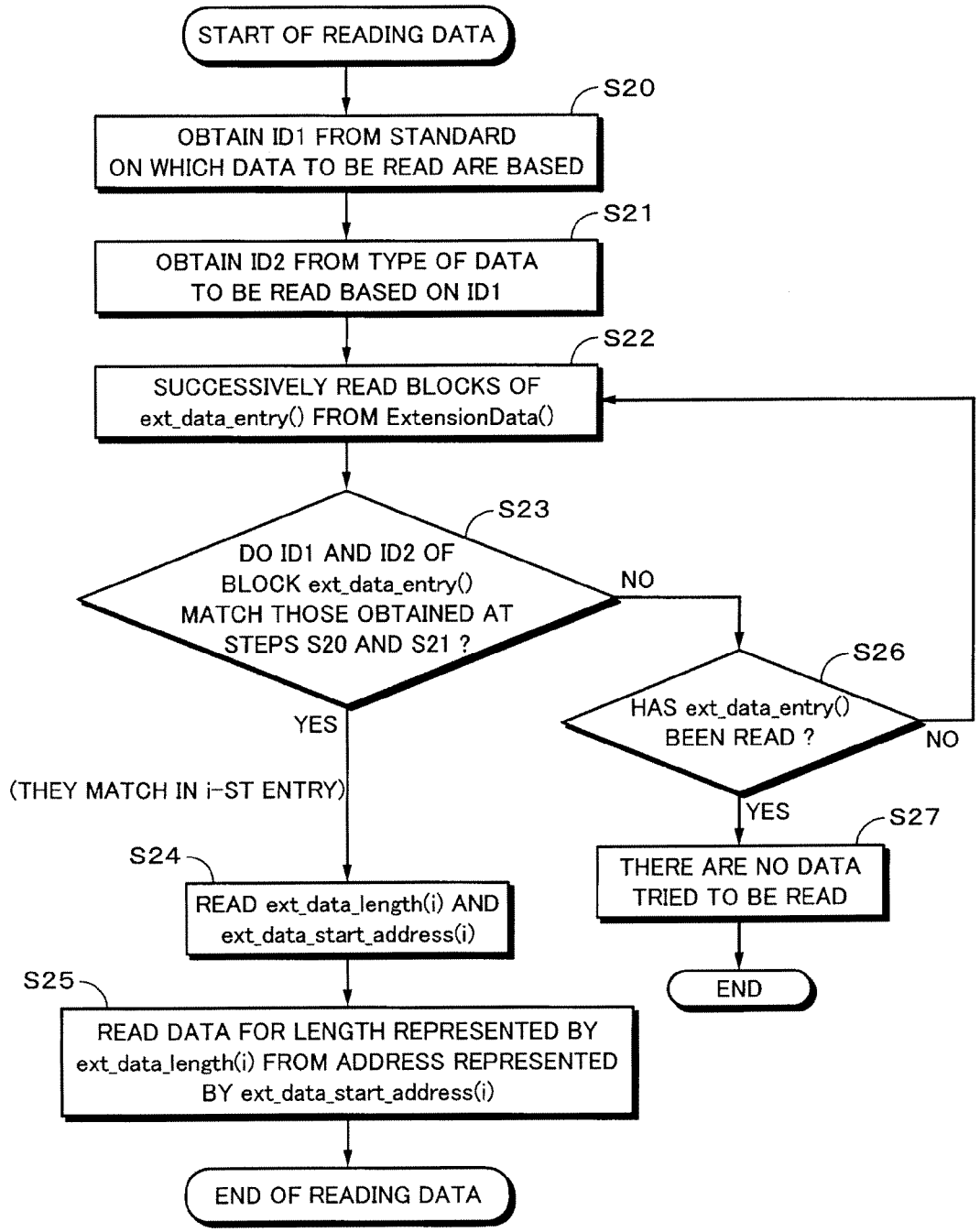
FIG. 18 is a flow chart showing an example of a process of reading extension data from block ExtensionData( )

FIG. 18 is a flow chart showing an example of a process of reading extension data from block ExtensionData( ) defined for index file "index.bdmv", play list file "xxxxx.mpls", and clip information file "zzzzz.clpi". The process shown in FIG. 18 is applicable both to a reproduction-only record medium (for example, a BD-ROM) and a recordable record medium (for example, a BD-RE).

First of all, at step S20, the value of field ID1 is obtained from the standard on which extension data to be read are based. Next, at step S21, the value of field ID2 is obtained from the type of extension data to be read.

Next, at step S22, blocks of ext_data_entry( ) are successively read from block ExtensionData( ). At step S23, it is determined whether the values of field ID1 and field ID2 contained in block ext_data_entry( ) that has been read match the values of field ID1 and field ID2 obtained at step S20 and step S21, respectively.

When the determined result denotes that they do not match, the flow advances to step S24. At step S24, it is determined whether all the blocks of ext_data_entry( ) of block ExtensionData( ) have been read. When the determined result denotes that all the blocks have been read, the flow advances to step S25. At step S25, it is determined that block ExtensionData( ) do not contain extension data to be read and the process is completed. When the determined result denotes that all the blocks have not been read, the flow returns to step S22. At step S22, the next block of ext_data_entry( ) is read from block ExtensionData( ).

When the determined result at step S23 denotes that the values of field ID1 and field ID2 of block ext_data_entry( ) match the values of field ID1 and field ID2 that have been obtained, the flow advances to step S26. In this example, it is assumed that they match in an [i]-th entry of block ExtensionData( ).

At step S26, the value of field ext_data_length[i] and the value of field ext_data_start_address[i] are read from the [i]-th entry of block ext_data_entry( ). Next, at step S27, data are read from the address represented by field ext_data_start_address that was read at step S26 for the data length represented by field ext_data_length[i].

Next, a virtual player will be described in brief. When a disc having the foregoing data structure is loaded into the player, it is necessary for the player to convert commands contained in a movie object or the like read from the disc into commands with which hardware of the player is controlled. The player pre-stores software with which such conversion is performed for commands in a read-only memory (ROM) of the player. Since this software causes the player to operate in accordance with the BD-ROM standard through the disc and the player, this software is referred to as the BD virtual player.

Figures 19A, 19B:
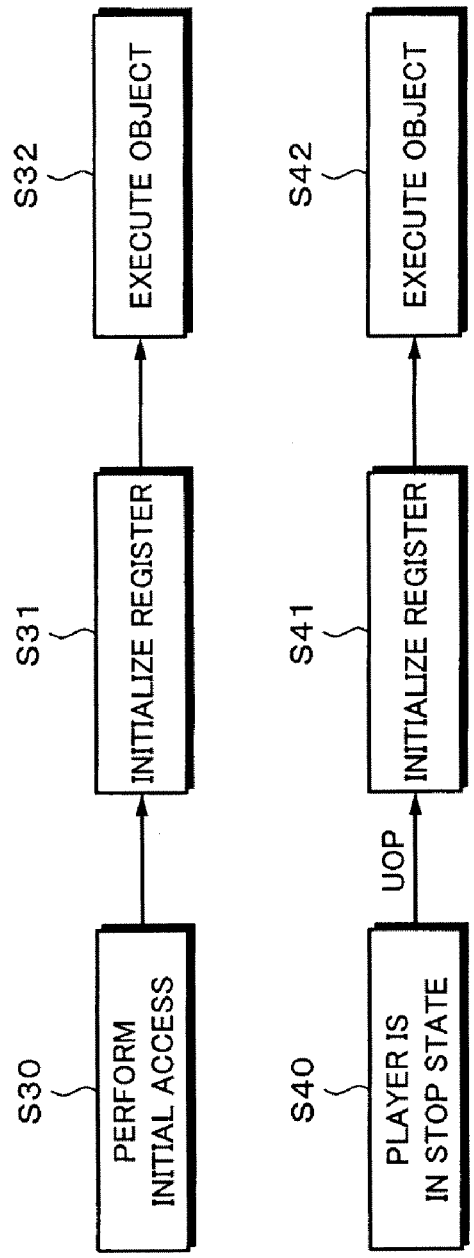
FIG. 19A and FIG. 19B are flow charts showing an operation of a BD virtual player.

FIG. 19A and FIG. 19B show the operation of the BD virtual player in brief. FIG. 19A shows an example of which the BD virtual player loads the disc. When the disc is loaded into the player and then the disc is initially accessed (at step S30), a register that stores common parameters used for one disc is initialized (at step S31). Next, at step S32, a program contained in a movie object or the like is read from the disc and then the program is executed. The initial access denotes that data are initially reproduced from the disc as in the case that the disc is loaded.

FIG. 19B shows an example of the operation of the player in the case that by pressing for example a play key of the player, the user commends the player to reproduce data from the disc in the stop state of the player. In the initial stop state (at step S40), the user commands the player to reproduce data from the disc for example with a remote control commander (by User Operation (UO)). When the player is commanded to reproduce data from the disc, the register, namely common parameters, is initialized (at step S41). Next, at step S42, a move object execution phase starts.

Next, with reference to FIG. 20, the reproduction of a play list in the movie object execution phase will be described. It is assumed that by the UO or the like, the player has been commanded to start reproducing content of title #1 from the disc. When the player has been commanded to start reproducing content from the disc, the player references the index table shown in FIG. 2 and obtains an object number corresponding to the reproduction of content of title #1. Assuming that the object number corresponding to the execution of content of title #1 is #1, the player starts executing movie object #1.

In the example shown in FIG. 20, assuming that the program contained in movie object #2 is composed of two lines and a command of the first line is "Play PlayList(1)", the player starts reproducing play list #1. Play list #1 is composed of one or more play items. The player successively reproduces play items. After the player has reproduced all the play items of play list #1, the player restores the execution of movie object #1. Thereafter, the player executes a command of the second line. In the example shown in FIG. 20, the command of the second line is "jump TopMenu". The player executes this command, namely a movie object that accomplishes the top menu (Top Menu) contained in the index table.

Figure 21B:
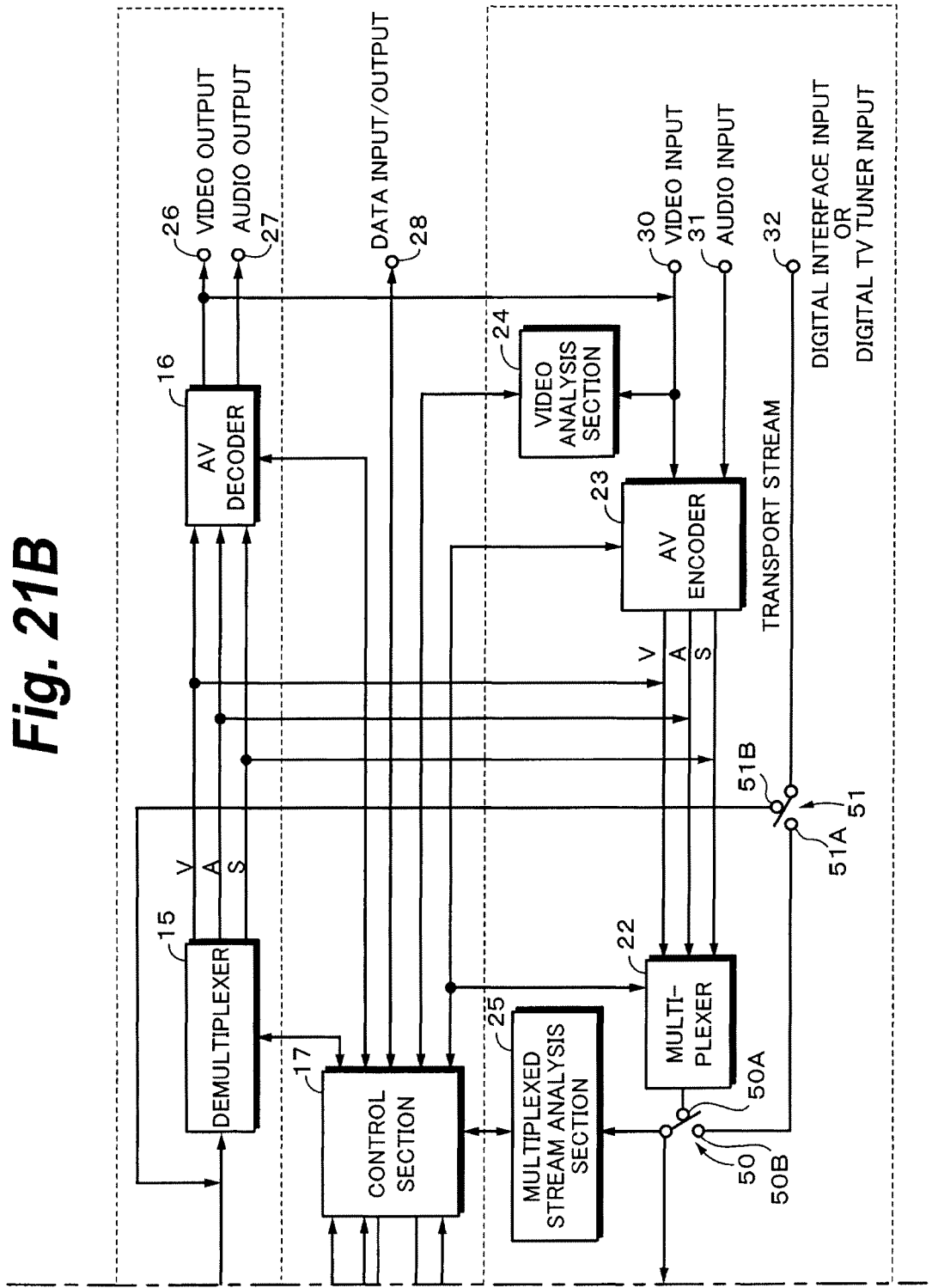
FIG. 21 is a block diagram showing an example of the structure of a recoding and reproducing apparatus according to an embodiment of the present invention.

Next, a recording and reproducing apparatus according to an embodiment of the present invention will be described. FIG. 21 shows an example of the structure of the recording and reproducing apparatus according to an embodiment of the present invention. A control section 17 is composed of for example a central processing unit (CPU), a read-only memory (ROM), a random-access memory (RAM), and so forth. The ROM pre-stores a program that causes the CUP to operate and data with which the CUP operates. The RAM is used as a work memory for the CPU. The ROM reads a program and data from the ROM when necessary, uses the RAM as a work memory, and controls the entire recoding and reproducing apparatus. The foregoing BD virtual player is accomplished by the control section 17 according to a program for example stored in the ROM.

Data about a device that supplies various types of data for example video data and audio data to the recording and reproducing apparatus (the device is for example a video camera or a tuner that can receive a digital television broadcast) and data about recording are input from a data input/output terminal 28 and supplied to a control section 17.

Data that are output from a user interface (not shown) that has an operation device such as various types of switches and a simple display device that displays data are input from the data input/output terminal 28. In addition, a display control signal generated in the control section 17 is supplied to the user interface through the data input/output terminal 28. The user interface supplies the display control signal to a monitor device such as a television receiver that displays data according to the display control signal.

First of all, a recording operation of the recording and reproducing apparatus will be described. A video signal is input to an input terminal 30. In addition, an audio signal is input to an input terminal 31. The input video signal and the input audio signal are supplied to an AV encoder 23. The video signal is also supplied to a video analysis section 24. The AV encoder 23 encodes the input video signal and the input audio data for example according to MPEG2 system and outputs an encoded video stream V, an encoded audio stream A, and system information S.

The AV encoder 23 encodes the audio signal for example into a format of an MPEG1 audio stream or a Dolby AC3 audio stream. The system information S is composed of encode information of the video signal and audio signal, such as byte sizes of encoded picture and audio frame and encode type of picture, and time information about synchronization of video and audio.

These encoded outputs of the AV encoder 23 are supplied to a multiplexer 22. The multiplexer 22 multiplexes the supplied encoded video stream V and audio stream A on the basis of the system information S and outputs a multiplexed stream as an MPEG2 transport stream. In other words, the encoded video stream V, the encoded audio stream A, and the system information S are divided in the size of a payload of a transport packet. A predetermined header is added to each divided portion. As a result, transport packets are obtained. A PID that identifies the type of data is added to the header of each packet.

The multiplexed stream is output from the multiplexer 22 and supplied to a source packetizer 21 and a multiplexed stream analysis section 25 through a terminal 50A of a switch 50. The source packetizer 21 encodes the supplied multiplexed stream according to an application format of the record medium.

A clip AV stream encoded by the source packetizer 21 is supplied to an error correction coding (ECC) encoding section 20. The ECC encoding section 20 encodes the clip AV stream with error correction code. A modulation section 19 modulates the encoded stream with record code. The modulated stream is supplied to a write section 18. The write section 18 records the modulated clip AV stream modulated with record code by a modulation section 19 to a recordable record medium 10 according to the control signal supplied from the control section 17.

The recording and reproducing apparatus directly inputs the transport stream of which a clip AV stream has been multiplexed and records the transport stream to the record medium. For example, a transport stream of a digital television broadcast or the like that is outputted from a digital interface or a digital television tuner is input to an input terminal 32.

It is thought that there are two methods of recording an input transport stream. In the first method, an input transport stream is transparently recorded. In the second method, an input transport stream is re-encoded and then recorded to reduce the record bit rate. The user selects one of the two methods with the user interface to record an input transport stream. A control signal corresponding to this operation is supplied to the control section 17 through the data input/output terminal 28. The control section 17 controls each section of the recording and reproducing apparatus according to this control signal to record an input transport stream to the record medium 10 in the selected method.

When the input transport stream is transparently recorded to the record medium 10, a terminal 50B of the switch 50 is selected and a terminal 51A of a switch 51 is selected. The transport stream inputted from the input terminal 32 is supplied to the source packetizer 21 and the multiplexed stream analysis section 25 through the switches 51 and 50. Thereafter, the transport stream is encoded and recorded in the same manner as the video signal and audio signal inputted from the input terminal 30 and the input terminal 31, respectively, are encoded and recorded.

When the input transport stream is re-encoded and then recorded to the record medium 10, a terminal 51B of the switch 51 is selected and thereby the transport stream inputted from the input terminal 32 is supplied to a demultiplexer 15. The demultiplexer 15 demultiplexes the transport stream into the encoded video stream V, the encoded audio stream A, and the system information S. The demultiplexer 15 supplies the encoded video stream V to an AV decoder 16 and the encoded audio stream A and the system information S to the multiplexer 22.

The AV decoder 16 decodes the encoded video stream V supplied from the demultiplexer 15 and supplies the decoded video signal to the AV encoder 23. The AV encoder 23 encodes the supplied video signal and obtains an encoded video stream V. The encoded video stream V is supplied to the multiplexer 22.

The multiplexer 22 multiplexes the encoded video stream V encoded and supplied by the AV encoder 23 and the encoded audio stream A demultiplexed by the demultiplexer 15 according to the system information S demultiplexed by the demultiplexer 15 and outputs a multiplexed stream. Thereafter, the multiplexed stream is encoded and recorded to the record medium 10 in the same manner as the video signal and the audio signal inputted from the input terminal 30 and the input terminal 31 are encoded and recorded.

The recording and reproducing apparatus records the clip AV stream file to the record medium 10 for example based on the BD-RE standard. In addition, the recording and reproducing apparatus also records application database information associated with the clip AV stream file to be recorded to the record medium 10. The application database information is created by the control section 17 on the basis of feature information of a moving picture supplied from the video analysis section 24, feature information of a clip AV stream supplied from the multiplexed stream analysis section 25, and user command information that is input from the data input/output terminal 28.

The feature information of the moving picture supplied from the video analysis section 24 is information created in the recording and reproducing apparatus when the AV encoder 23 encodes the video signal and records the encoded video signal to the record medium 10. Supplied to the video analysis section 24 is a video signal inputted from the input terminal 30 or a video signal of which a transport stream inputted from the input terminal 32 has been demultiplexed by the demultiplexer 15 and decoded by the AV decoder 16. The video analysis section 24 analyzes contents of the supplied video signal and creates information about an image of a feature mark point of the input video signal. For example, the video analysis section 24 detects feature mark points such as a program start point, a scene change point, and commercial message (CM) start and end points from the input video signal and obtains command information of images of the detected mark points. Instead, thumbnail images of images of mark points may be created. A thumbnail image is an image of which real image data are reduced for example by a thin-out process. The position of a thumbnail image on a clip AV stream can be represented with a presentation time stamp (PTS).

Command information of these images, thumbnail images, and position information (for example, PTS) of thumbnail images are supplied to the multiplexer 22 through the control section 17. When the multiplexer 22 multiplexes an encoded picture of which images of mark points designated by the control section 17 have been encoded, the multiplexer 22 returns address information of the encoded picture on the clip AV stream to the control section 17. The control section 17 correlates the type of a feature image with address information of the corresponding encoded picture on the clip AV stream and stores the correlated data for example in the RAM.

The feature information of the clip AV stream obtained from the multiplexed stream analysis section 25 is information associated with encode information of the clip AV stream and is created in the moving picture recording and reproducing apparatus. The feature information of the clip AV stream contains time stamp of an entry point of the clip AV stream and the corresponding address information. In addition, the feature information of the clip AV stream contains discontinuity information of a system time clock (STC), change information of contents of a program, address information corresponding to an arrival time, and so forth.

When a transport stream that is input from the input terminal 32 is transparently recorded to the record medium 10, the multiplexed stream analysis section 25 detects images of feature mark points from a clip AV stream and creates information about the types and addresses of the detected images. This information becomes data contained in block ClipMark of the clip information file. Thus, the feature information of the clip AV stream obtained by the multiplexed stream analysis section 25 is stored in the clip information file, which is a database of the clip AV stream. These information obtained by the multiplexed stream analysis section 25 is temporarily stored in the RAM of the control section 17.

Command information that the user has issued to the user interface (not shown) is supplied from the data input/output terminal 28 to the control section 17. This command information includes designation information of a reproduction region that the user likes in the clip AV stream, characters that describes the contents of the reproduction region, a book mark point that the user sets for his or hear favorite scene, a time stamp of a resume point in the clip AV stream, and so forth. These user's command information is temporarily stored in the RAM of the control section 17. These command information is stored in a database of a play list on the record medium 10.

The control section 17 creates a database of a clip AV stream (clip information), a database of a play list (play list file), management information for contents of a record medium (index file), and thumbnail information on the basis of the foregoing input information stored in the RAM, namely feature information of a moving picture obtained from the video analysis section 24, feature information of a clip AV stream obtained from the multiplexed stream analysis section 25, and user command information inputted from the data input/output terminal 28.

When the control section 17 creates an index file, the control section 17 can create extension data with which an index file, a play list file, and/or a clip information file are extended on the basis of data about the apparatus and information about recording that are input from the data input/output terminal 28. In other words, the control section 17 embeds extension data in a file on the basis of data inputted from the data input/output terminal 28 according to the process described with reference to the flow chart shown in FIG. 17.

These database information is read from the RAM of the control section 17, supplied from the control section 17 to the ECC encoding section 20, encoded with error correction code by the ECC section 20, modulated with record code by the modulation section 19, and supplied to the write section 18 in the same manner as the clip AV stream. The write section 18 records the database information that has been encoded with record code to the record medium 10 according to the control signal supplied from the control section 17.

Next, the reproducing operation of the recording and reproducing apparatus will be described. An application database information composed of a clip AV stream file, a play list file, and an index file has been created in the same manner as described in the part of the recording operation of the recording and reproducing apparatus and recorded on the record medium 10. When the record medium 10 is loaded into a drive device (not shown), the control section 17 commands a read section 11 to read the application database information from the record medium 10. When the read section 11 is commanded to read the application database information, the read section 11 reads the application database information from the record medium 10. An output of the read section 11 is supplied to a demodulation section 12.

The demodulation section 12 demodulates the output of the read section 11, decodes record code, and obtains digital data. An output of the demodulation section 12 is supplied to an ECC decoding section 13. The ECC decoding section 13 decodes the error correction code and performs an error correction process for the decoded data. The error corrected application database information is supplied to the control section 17.

The control section 17 outputs a table of play lists recorded on the record medium 10 to the user interface through a user interface input/output terminal on the basis of the application database information. The table of play lists is displayed for example on the display section of the user interface in a predetermined manner. The user selects his or her desired play list from the table and performs a reproduction operation for the selected play list on the user interface. A control signal corresponding to the operation is output from the user interface and supplied to the control section 17 through the data input/output terminal 28.

The control section 17 commands the read section 11 to read a clip AV stream file necessary to reproduce the selected play list according to the control signal. The read section 11 reads the clip AV stream file from the record medium 10 as commanded. An output of the read section 11 is supplied to the demodulation section 12. The demodulation section 12 demodulates the supplied signal, decodes record code, and outputs digital data to the ECC decoding section 13. The ECC decoding section 13 decodes error correction code of the supplied digital data, corrects errors of the decoded data, and outputs an error-corrected clip AV stream file. The error-corrected clip AV stream file is supplied to a file system section (not shown) of the control section 17. The file system section processes the error-corrected clip AV stream file and supplies the processed file to a source depacketizer 14.

The source depacketizer 14 converts the clip AV stream file recorded in the application format on the record medium 10 into a stream in the format of the demultiplexer 15 under the control of the control section 17. The source depacketizer 14 divides an MPEG2 transport stream reproduced from the record medium 10 into source packets, removes the header from the source packets, and obtains transport packets. The transport packets as a clip AV stream are supplied to the demultiplexer 15.

The demultiplexer 15 outputs a video stream V, an audio stream A, and system information S, which compose a reproduction region (PlayItem) designated by the control section 17, of the clip AV stream supplied from the source depacketizer 14 under the control of the control section 17 and supplies them to the AV decoder 16. For example, the demultiplexer 15 selects supplied transport packets on the basis of their PIDs, removes the transport packet header therefrom, and outputs the resultant transport packets. The AV decoder 16 decodes the supplied video stream V and audio stream A and supplies the decoded reproduction video signal and audio signal to a video output terminal 26 and an audio output terminal 27, respectively.

When an index file, a clip AV stream file, and/or a play list file contains extension data, the control section 17 obtains extension data embedded in the file or files according to the process described with reference to the flow chart shown in FIG. 18. The control section 17 can perform a predetermined process on the basis of the obtained extension data. In the example of the extension data shown in FIG. 16, the control section 17 is thought to for example determine whether data recorded on the record medium 10 is rewritable, control the display of thumbnail images, and control record date/time indications of record data.

In the foregoing example, the record medium 10 was described to be a recordable disc based on the BD-RE standard. The record medium 10 is not limited to such a disc. In other words, in only the processes on the reproducing section side, the record medium 10 may be a reproduction-only disc based on the BD-ROM standard. When a reproduction-only record medium is used as the record medium 10, the operation on the reproducing section side is the same as that of the foregoing example. Of course, the operation on the recording section side is not preformed. When a reproduction-only record medium is used, as a reproducing apparatus, the structure on the recording section side may be omitted from the structure shown in FIG. 16. Instead, as a recording apparatus, the structure on the reproducing section side may be omitted from the structure shown in FIG. 16.

In the foregoing example, the moving picture recoding and reproducing apparatus shown in FIG. 16 was described to be structured as hardware. However, instead, the moving picture recording and reproducing apparatus may be composed of software except for mechanical sections such as a drive section into which the record medium 10 is loaded. In this case, software is pre-stored for example in a ROM of the control section 17. Instead, the moving picture recording and reproducing apparatus may be structured on a computer device such as a personal computer. In this case, software that causes the computer device to operate as the moving picture recording and reproducing apparatus is recorded on a record medium such as a ROM or a DVD-ROM and the record medium is provided. When the computer device can be connected to a network such as the Internet, such software can be provided therethrough.

It should be understood by those skilled in the art that various modifications, combinations, sub-combinations and alternations may occur depending on design requirements and other factors insofar as they are within the scope of the appended claims or the equivalents thereof.

What is claimed is:

1. A recording apparatus which records at least content data and reproduction control information with which reproduction of the content data is controlled to a record medium, comprising:

a recording section which records to the record medium an index table with which reproduction of content data is managed, an object which is called to the index table and which represents a method of reproducing at least the content data, a play list called from the object, and clip information which is called based on the play list and which represents attribute information of at least the content data, wherein at least the index table, the play list, and the clip information each are capable of containing extension data, wherein the extension data contain a main body of the extension data, main identification information, and sub identification information as identification information which identifies the extension data, and wherein the main identification information represents a group or an organization which has defined the extension data, and wherein the sub identification information represents an application of which the extension data are used.

2. The recording apparatus as set forth in claim 1, wherein the sub identification information is defined by the group or the organization represented by the main identification information or a person licensed by the group or the organization.

3. The recording apparatus as set forth in claim 1, wherein the extension data include:

a data block as part of the main body of the extension data, and which is capable of containing a plurality of main bodies of the extension data; and a data entry which contains information with which the main bodies of the extension data contained in the data block are obtained, wherein the data entry contains the main identification information, the sub identification information, position information, and information which represents a data length for each of the main bodies of the extension data contained in the data block.

4. A recording method of recording at least content data and reproduction control information with which reproduction of the content data is controlled to a record medium, comprising:

recording to the record medium an index table with which reproduction of content data is managed, an object which is called to the index table and which represents a method of reproducing at least the content data, a play list called from the object, and clip information which is called based on the play list and which represents attribute information of at least the content data, wherein at least the index table, the play list, and the clip information each are capable of containing extension data, wherein the extension data contain a main body of the extension data, main identification information, and sub identification information as identification information which identifies the extension data, wherein the main identification information represents a group or an organization which has defined the extension data, and wherein the sub identification information represents an application of which the extension data are used.

5. A reproducing apparatus which produces data from a record medium on which at least content data and reproduction control information with which reproduction of the content data is controlled have been recorded, comprising:

a reproducing section which reproduces data from the record medium on which an index table with which reproduction of content data is managed, an object which is called to the index table and which represents a method of reproducing at least the content data, a play list called from the object, and clip information which is called based on the play list and which represents attribute information of at least the content data have been recorded;

an extension data extracting section which extracts extension data from the data reproduced by the reproducing section, wherein at least the index table, the play list, and the clip information each are capable of containing the extension data, wherein the extension data contain a main body of the extension data, main identification information, and sub identification information as identification information which identifies the extension data, wherein the main identification information represents a group or an organization which has defined the extension data, and wherein the sub identification information represents an application of which the extension data are used.

6. The reproducing apparatus as set forth in claim 5, wherein the sub identification information is defined by the group or the organization represented by the main identification information or a person licensed by the group or the organization.

7. The reproducing apparatus as set forth in claim 5, wherein the extension data include:

a data block as part of the main body of the extension data, and which is capable of containing a plurality of main bodies of the extension data; and a data entry which contains the main identification information, the sub identification information, position information, and information which represents a data length for each of the main bodies of the extension data contained in the data block, and wherein the extension data extracting section selectively extracts a main body of the extension data contained in the data block based on the data entry.

8. A reproducing method of reproducing data from a record medium on which at least content data and reproduction control information with which reproduction of the content data is controlled have been recorded, comprising:

reproducing data from the record medium on which an index table with which reproduction of content data is managed, an object which is called to the index table and which represents a method of reproducing at least the content data, a play list called from the object, and clip information which is called based on the play list and which represents attribute information of at least the content data have been recorded; and extracting extension data from the data reproduced at the reproducing step, wherein at least the index table, the play list, and the clip information each are capable of containing the extension data, wherein the extension data contain a main body of the extension data, main identification information, and sub identification information as identification information which identifies the extension data, wherein the main identification information represents a group or an organization which has defined the extension data, and wherein the sub identification information represents an application of which the extension data are used.

9. A reproducing process which causes a computer device to execute a reproducing method of reproducing data from a record medium on which at least content data and reproduction control information with which reproduction of the content data is controlled have been recorded, comprising:

reproducing data from the record medium on which an index table with which reproduction of content data is managed, an object which is called to the index table and which represents a method of reproducing at least the content data, a play list called from the object, and clip information which is called based on the play list and which represents attribute information of at least the content data have been recorded;

extracting extension data from the data reproduced at the reproducing step, wherein at least the index table, the play list, and the clip information each are capable of containing the extension data, wherein the extension data contain a main body of the extension data, main identification information, and sub identification information as identification information which identifies the extension data, wherein the main identification information represents a group or an organization which has defined the extension data, and wherein the sub identification information represents an application of which the extension data are used.

10. A record medium on which at least content data and reproduction control information with which reproduction of the content data is controlled are recorded as a data structure, the data structure comprising:

an index table with which reproduction of content data is managed;

an object which is called to the index table and which represents a method of reproducing at least the content data;

a play list called from the object;

clip information which is called based on the play list and which represents attribute information of at least the content data, wherein at least the index table, the play list, and the clip information each are capable of containing extension data, wherein the extension data contain a main body of the extension data, main identification information, and sub identification information as identification information which identifies the extension data, wherein the main identification information represents a group or an organization which has defined the extension data, and wherein the sub identification information represents an application of which the extension data are used.

* * * * *